United States Patent Office 3,372,157
Patented Mar. 5, 1968

3,372,157
6-AMINO-PENICILLANIC ACID DERIVATIVES
Peter Baumann, Frenkendorf, Basel-Land, Markus Zimmermann, Riehen, and Franz Häfliger, Basel, Switzerland, assignors to Geigy Chemical Corporation, Greenburgh, N.Y., a corporation of Delaware
No Drawing. Continuation-in-part of applications Ser. No. 252,593, Jan. 21, 1963, Ser. No. 263,421, Mar. 7, 1963, Ser. No. 263,422, Mar. 7, 1963 and Ser. No. 442,529, Mar. 24, 1965. This application July 8, 1965, Ser. No. 470,604
Claims priority, application Switzerland, Jan. 26, 1962, 977/62; Mar. 9, 1962, 2,878/62, 2,879/62; Jan. 4, 1963, 66/63; Mar. 6, 1963, 2,854/63, 2,855/63; Sept. 4, 1964, 11,560/64

42 Claims. (Cl. 260—239.1)

This application is a continuation-in-part application of our pending patent application Ser. No. 252,593, filed Jan. 21, 1963 and of patent applications Ser. Nos. 263,421 and 263,422, filed Mar. 7, 1965 and Ser. No. 442,529, filed Mar. 24, 1965, in our names and in the name of Andre Gagneux, all now abandoned.

This invention relates to new derivatives of 6-amino-penicillanic acid which are useful in chemotherapy.

Penicillins such as the naturally occurring penicillin G suffer from the drawbacks of being easily destroyed by acids such as hydrochloric acid in the gastric juices, and of being inactivated by penicillinase, an enzyme which is produced, for instance, by certain strains of gram-positive bacteria which thus become known as being "penicillin-G-resistant."

It is, therefore, an object of the invention to provide new derivatives of 6-amino-penicillanic acid which are effective against penicillin-resistant gram-positive bacteria; it is a further object to provide such derivatives which are active against the said resistant bacteria and are also sufficiently acid-resistant to permit oral application.

In a first aspect, this invention concerns compounds of the formula

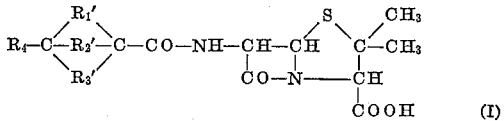

(I)

and the salts thereof with inorganic and organic bases, which possess an excellent anti-bacterial effect against gram-positive bacteria, which effect is also extended to strains of these bacteria which are resistant to penicillin G, can be produced by the process described further below.

In the above indicated formula $R'_1$ and $R'_2$ represent independently of one another mono- to tetramethylene radicals, or alkenylene radicals having a maximum of 4 carbon atoms, which radicals may be substituted for example by lower alkyl radicals, halogen atoms and/or oxo radicals and may also be directly inter-connected;

$R'_3$ represents the direct linkage or a radical corresponding to the definition of $R'_1$ and $R'_2$; and $R_4$ represents hydrogen, a lower alkyl radical or a halogen atom.

For producing the compounds of the general Formula I, 6-amino-penicillanic acid or a salt thereof is reacted with a compound introducing the radical of an acid of the general formula

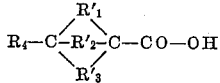

(II)

wherein $R'_1$, $R'_2$, $R'_3$ and $R_4$ have the above indicated significance. Halides, anhydrides and mixed anhydrides in the presence of acid-binding agents, free acids in the presence of agents combining with water, and azides and activated esters, such as for example cyanomethyl esters, are particularly suitable as such starting compounds. In the method according to the invention, sodium or potassium bicarbonate, carbonate or hydroxide in aqueous-organic or organic medium, and tertiary organic bases such as triethylamine or pyridine in organic medium, for example in dioxan, tetrahydrofuran, acetone or chloroform, are in particular suitable as acid-combining agents, and dicyclohexyl carbodiimide for example as an agent combining with water. Mixed anhydrides of acids of the general formula II are especially, on one hand, those with lower alkanoic acids, in particular acetic acid, and, on the other hand, anhydrides with carbonic acid semi-esters, as they are obtained, for example, by the reaction of acids of the general Formula II with the benzyl, -p-nitro-benzyl, -isobutyl, -ethyl or -methallyl esters of chloroformic acid.

The isolation of the reaction products from aqueous-organic reaction media is carried out for example by acidifying in the cold and by taking up the separated 6-acylamino-penicillanic acid in a water-immiscible organic solvent. The said acid can be extracted from the resulting mixture, for example, with an aqueous sodium or potassium bicarbonate solution, and the resulting aqueous solution of the sodium or potassium salt of the 6-acylamino-penicillanic acid can be evaporated under reduced pressure at low temperatures, which method is generally known as lyophilization. Salts with organic bases are isolated, for example, by treating the above mentioned solutions in organic solvents with suitable organic bases and separating and drying the precipitated salts.

Adamantane-1-carboxylic acid, d,l-ketopinic acid, tricyclenic acid, camphenonic acid, and other synthetically produced bicyclo-compounds, for example bicyclo[2,2,2]oct-2-ene-1-carboxylic acid and dekalin-9-carboxylic acid can be regarded as examples of the acids of the general Formula II.

Sodium, potassium, lithium, ammonium, calcium salts, or salts of organic bases such as diethylamine, triethylamine, diethanolamine, N-ethyl-diethanolamine, diethylaminoethanol, pyrrolidine, piperidine, N-ethyl-piperidine, 1 - (β - hydroxyethyl)-piperidine, morpholine, procaine, benzylamine, dibenzylamine and other amines, which are frequently used for producing penicillin salts, are named as salts of acids of the general Formula I, which may be produced in accordance with the invention.

6-amino-penicillanic acid derivatives which are particularly effective against penicillin-resistant gram-positive bacteria and many of which are also sufficiently resistant to acid to permit peroral application, are those of the formula

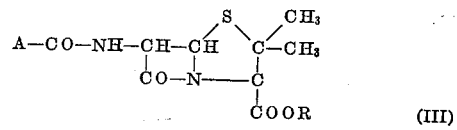

(III)

wherein R is either hydrogen or a pharmaceutically acceptable cation, and A is one of the radicals of the formulas (a) 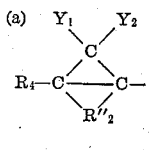   (b) 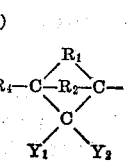

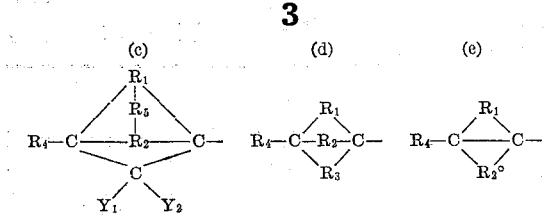

wherein each of $R_1$, $R_2$ and $R_3$, independently, represents alkylene, lower alkyl-alkylene, hydroxy-alkylene, oxo-alkylene, lower alkoxy-alkylene, chloro-alkylene, bromo-alkylene, chloro-lower alkyl-alkylene or bromo-lower alkyl-alkylene, or exo-methylene-alkylene, the latter three especially in the case of radical (b), or alkenylene especially in the case of radical (d), the number of carbon atoms of "alkylene" or "alkenylene" in the aforesaid definitions of $R_1$, $R_2$ and $R_3$ being from 2 to 4 and especially in the case of radicals (b) and (d) preferably 2 carbon atoms, which carbon atoms are ring members between the two C-bridgeheads, $R_4$ represents hydrogen or lower alkyl, preferably with not more than 5 carbon atoms, or halogen, preferably chlorine and bromine, and as a second choice, iodine or fluorine, or, especially in the case of radical (c), phenyl;

$R_5$ is an alkylene radical of from 1 to 2 carbon atoms;

$Y_1$ represents hydrogen, lower alkyl, hydroxyl or lower alkoxy;

$Y_2$ represents hydrogen or lower alkyl, and $Y_1$ and $Y_2$ taken together can be oxo;

$R_2''$ represents alkylene, lower alkyl-alkylene, hydroxy-alkylene, oxo-alkylene or lower alkoxy-alkylene, each alkylene of $R_2''$ containing from 3 to maximally 4 carbon atoms.

In the case of radical (e), $R_2°$ represents preferably only alkylene, hydroxy-alkylene, oxo-alkylene, or oxo-alkenylene, the number of carbon atoms of $R_2°$ in this case being from 3 to 4.

The antibiotic activity of the compounds of Formula I, according to the invention, is determined in near accordance with the agar-incorporation test described by Florey et al. in "Antiobiotics," published by Oxford University Press 1949, especially pages 201–203. In this test, a culture of microorganisms grown at 37° C. for 24 hours is transferred with the aid of a velvet-covered sterile stamper to a series of sterile agar plates containing the antibiotic to be tested in varying concentrations. The inoculated plates (sub-cultures) are then incubated at 37° C. for 24 hours. That concentration of the antibiotic at which growth of the respective bacterium is completely inhibited is called the "minimal inhibitory concentration."

The following non-limitative examples explain the production of the new derivatives of 6-amino-penicillanic acid more fully. In these examples temperatures are given in degrees centigrade. Parts and percentages are by weight, unless stated otherwise. Yields are given in percent of the theoretical values. Pe in the formulas given hereinafter represents the moiety.

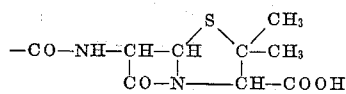

*Example 1.—Preparation of the Na-salt of adamantyl-(1)-penicillin*

1.16 grams (g.) of a crude product containing 86.1% of 6-amino-penicillanic acid, which product is obtained as described in "Nature" 183, page 257 (1959), is dissolved in 25 milliliters (ml.) of distilled water containing 3 g. of sodium bicarbonate. The pale brown, clear solution is cooled to 0° to 5°, 0.92 g. adamantane-1-carboxylic acid chloride (M.P.: 50.5°; see Chem. Ber. 92, 1633 (1959)), dissolved in 25 ml. of acetone, are added drop by drop within 10 minutes and the reaction mixture is stirred at room temperature for 1 hour. After this period its pH-value is 8.6. The reaction mixture is now filtered through cotton wool and the filtrate is washed twice with 5 ml. of methylisobutyl ketone. After being covered with a layer of 15 ml. of methylisobutyl ketone, the filtrate is subsequently adjusted to pH 2.1 by adding 10 N sulfuric acid and at the same time vigorously stirred. The phases are separated and the aqueous layer extracted once with 5 ml. of methylisobutyl ketone. The combined methylisobutyl ketone solutions are washed with 5 ml. of water and then mixed with as much 3%-sodium bicarbonate solution while being stirred, until a pH 6.8 to 7.0 is reached. The phases are separated, the organic phase is extracted with 5 ml. of water and the aqueous constituents are combined and washed with 25 ml. of ether. The aqueous solution of the reaction product is then first freed in a rotary evaporator under reduced pressure and at room temperature from dissolved ether, and then dehydrated by freezing in a dry ice/acetone mixture and subjecting the frozen product to high vacuum treatment. The adamantyl-(1)-penicillin-sodium salt [i.e., sodium 6-(adamantane-1'-carboxamido)-penicillanate] is thereby obtained as a voluminous white powder which is slightly hygroscopic (Yield=68%).

In its infra-red spectrum (potassium bromide) the substance shows main bands at 2.98, 3.46, 5.67, 6.22, 6.67, 7.13, 7.61 and 8.90μ. The strong band at 5.67μ indicates the presence of a β-lactam ring.

The substance is soluble in the following solvents: dimethyl formamide, N,N-dimethyl acetamide, methanol, ethanol and other low alcohols, glycerol, methylene chloride, chloroform, tetrahydrofuran, pyridine. It is only very slightly soluble or completely insoluble in ethyl acetate, acetone, dioxan, ether, benzene, petroleum ether, diethylene glycol diethyl ether.

Optical rotation: $[\alpha]_D^{20}$ +203.8° (c.=1 in water).

In the thin layer chromatogram (silica gel G buffered with 0.1 molar $NaH_2PO_4$) a single bright spot is shown in the system cyclohexane/ether/methanol 90:20:20. R-value in relation to penicillin G (Na-salt): 1.19 (the ratio of $R_f$ of the new substance: $R_f$ of penicillin G.). The spots are made visible by spraying with a n/10-iodine solution in water, containing 3.5% sodium azide (see Archiv Pharm. 294, 1 (1961)).

In the Agar-incorporation test, this product inhibits the growth of Staphylococcus aureus Smith ATCC 13,709 at a concentration of 0.15 microgram per liter (mcg./l.), and inhibits the growth of Staphylococcus aureus Geigy 5003 (a highly penicillin-G-resistant strain, available upon request from J. R. Geigy A.G., Basel, Switzerland) at a concentration of 0.62 microgram per milliliter (mcg./ml.).

Similar results are obtained when using, in the preparation of the new substance according to this example, adamantane-1-carboxylic acid bromide instead of the chloride.

Adamantyl-(1)-penicillin has the formula

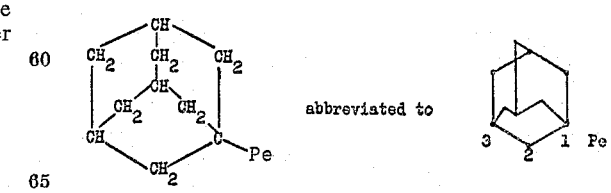

*Preparation of organic salts of adamantyl-(1)-penicillin*

For the production of N-ethyl piperidinium salt, the sodium salt is dissolved in water and adjusted to pH 2.1 with 10 N-sulfuric acid. The free acid of adamantyl-(1)-penicillin is extracted with ether and the ether solution dried by way of anhydrous sodium sulfate. It is cooled to −5° and a previously calculated quantity of N-ethylpiperidine is added drop by drop. The precipitating N-ethyl piperidinium salt of adamantyl-(1)-penicillin is separated from the mother liquor by centrifuging and dried in high vacuum.

In an analogous manner, the di-ethylammonium salt, triethylammonium salt, diethylammonium salt, N-ethyl-diethanolammonium salt, pyrrolidinium salt, piperidinium salt, N-(β-hydroxyethyl)piperidinium salt, morpholinium salt and dibenzylammonium salt of adamantyl-(1)-penicillin, all of similar antibiotic activity as the sodium salt but of different solubility in organic solvents and water, are obtained by using in the last-described reaction the respective amine instead of N-ethyl-piperidine.

Where no precipitate is formed, the product is obtained by evaporation of the solvent (ether) under reduced pressure.

*Preparation of the calcium-salt*

0.4 g. of the sodium salt of adamantyl-(1)-penicillin is dissolved in 10 ml. of water and a supernatant layer of methyl-isobutyl ketone is formed thereover by adding 10 ml. of the latter. 10-normal sulfuric acid is added with stirring to acidify to pH 2, and the layers are then separated. The aqueous phase is extracted further with 5 ml. of methyl-isobutyl ketone, the organic extracts are combined, washed twice with 2 ml. of water, and dried with anhydrous sodium sulfate.

The resulting organic solution of the free acid of adamantyl-(1)-penicillin is vigorously shaken 3 to 8° with a solution of 37 milligrams (mg.) of calcium hydroxide in 25 ml. of water, and the resulting phases are then separated. The aqueous phase is washed twice with 5 ml. of ether, then filtered rapidly, and the filtrate left standing for 48 hours in a refrigerator at 4°. The resulting precipitate consisting of the calcium salt of adamantyl-(1)-penicillin is separated by filtration and washed with a small amount of ether, and finally dried in high vacuum. It is readily soluble in dimethyl formamide, but only difficultly soluble in water. In the Agar-incorporation test, it shows the same antibiotic activity as the sodium salt.

*Example 2*

By replacing, in the preceding example, adamantane-1-carboxylic acid chloride by 1.08 g. of the crude reaction product of 3-chloro-adamantane-1-carboxylic acid with thionyl chloride, which has been produced under standard procedure [Ber. 95, page 667 (1962)] (the corresponding product is designated in the following examples as "acid chloride"), there is obtained the sodium salt of 3-chloro-adamantyl-(1)-penicillin (Yield 40%).

In the Agar-incorporation test, this salt inhibits the growth of *Staphylococcus aureus* Smith ATCC 13,709 at a concentration of 0.1 mcg./ml., and the growth of *Staphylococcus aureus* Geigy 5002 (also available from J. R. Geigy A.G), which is resistant to penicillin G, at a concentration of between 1 and 10 mcg./ml.

In a similar manner as described above, there are obtained, with the use, instead of adamantane-1-carboxylic acid, of the corresponding starting materials which have been described in Ber. 95, 667 (1962); in equimolar amounts:

3-bromo-adamantyl-(1)-penicillin;
3-iodo-adamantyl-(1)-penicillin; and
3-phenyl-adamantyl-(1)-penicillin, with similar activities as the above-described new penicillin derivatives.

The above-named penicillin-G-resistant strain of *Staph. aureus* requires more than 100 mcg./ml. of penicillin G to inhibit its growth.

*Example 3*

1 g. tricyclo[4,3,1,1³,⁸]undecane-3-carboxylic acid (described in Chem. Ber. 92, 1634 (1959), and C. A. 53, 2872s (1959)) and 0.7 ml. triethylamine are dissolved in 12 ml. dioxan and 10 ml. acetone and cooled to 0 to 5°. 0.63 ml. chloroformic acid isobutyl ester, dissolved in 5 ml. dioxan, is added thereto, stirred for 30 minutes at 0° and separated by filtration from triethylamine hydrochloride. The filtrate is cooled to 0° and a solution of 1.16 g. 6-amino-penicillanic acid 86.1% in 10 ml. water and 1 ml. triethylamine are added to this filtrate which is kept at 0°. The reaction solution is stirred for 60 minutes, a weak gas development being perceptible. 10 ml. of water containing 1 g. of sodium bicarbonate are added and the whole is washed twice with 25 ml. of ether. The aqueous phase is covered with a layer of 20 ml. of methylisobutyl ketone and is adjusted to pH 2.1 with 10-normal sulfuric acid, the free acid of the penicillin passing into the organic phase. The layers are separated and the aqueous portion is again extracted twice using 5 ml. methylisobutyl ketone each time. All methylisobutyl ketone extracts are combined and washed with 5 ml. water, then stirred with sodium bicarbonate solution (3%) until the aqueous portion reaches pH 6.8. The remaining treatment is effected in exactly the same manner as described in Example 1. As a product, the sodium salt of tricyclo [4,3,1,1³,⁸]undecyl-(3)-penicillin [i.e. sodium 6-(tricyclo[4,3,1,1³',⁸']undecane-3'-carboxamido)-penicillanate] is obtained in the form of a white, voluminous, amorphous powder (Yield=44%).

It has antibiotic activity similar to adamantyl-(1)-penicillin described in Example 1.

The formula of the free acid obtained by the method described in Example 3, is

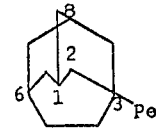

*Example 4.—3-fluoro-, 3-methoxy-, 3-hydroxy- and 3-carboxy-adamantyl-(1)-penicillins*

Example 3 is repeated, but instead of the tricyclo-undecane carboxylic acid used therein, there is employed 0.92 g. of 3-fluoro-adamantane-1-carboxylic acid (Ber. 95, page 667 (1962)), and the sodium salt of 3-fluoro-adamantyl-(1)-penicillin is obtained, which shows similar activity as the new penicillin derivatives described in Example 1. (Yield ca. 30%).

In a similar manner, the sodium salt of 3-methoxy-adamantyl-(1)-penicillin is obtained by employing 0.97 g. of 3-methoxy-adamantane-1-carboxylic acid; its activity is similar to that of the other new penicillin derrivatives described in Example 1 (yield ca. 50%).

3-hydroxy-adamantyl-(1)-penicillin is obtained as described above when employing 0.91 g. of 3-hydroxy-adamantane-1-carboxylic acid with a yield of ca. 60%, and the disodium salt of 3-carboxy-adamantyl-(1)-penicillin is obtained with a yield of 64% when employing 1.04 g. of adamantane-1,3-dicarboxylic acid. The activities of the last-mentioned penicillin derivatives are similar to those of the preceding ones. The starting materials have been described in "Berichte" supra.

*Example 5*

Example 3 is repeated, but instead of the tricyclo-undecane carboxylic acid used therein, there is employed 0.85 g. of 7,7-dimethyl-2-hydroxy-bicyclo[2,2,1]heptane-1-carboxylic acid, and the sodium salt of 7,7-dimethyl-2-hydroxy-bicyclo[2,2,1]heptyl-(1)-penicillin is obtained with a yield of 36%.

This sodium salt inhibits the growth of *Staphylococcus aureus* Smith ATCC 13,709 at a concentration of 0.1 mcg./ml. and the above-mentioned penicillin-G-resistant strain Geigy 5002 at between 1 and 10 mcg./ml.

The starting 7,7-dimethyl-2-hydroxy-bicyclo[2,2,1]heptane-1-carboxylic acid is obtained by stirring 2 g. of ketopinic acid with a sufficient amount of saturated sodium bicarbonate solution at room temperature to obtain a clear solution. The latter is then cooled in an ice bath to 0 to 5° and a solution of 1 g. of sodium borohydride in 20 ml. of water is added thereto drop by drop. Stirring is continued for 3 hours at room temperature (20°) and acetone is then added to destroy the excess of the reducing agent. After acidifying with 2-normal aqueous hydrochloric acid to a pH of about 0 to 1, one extracts three times using 20 ml. of ether each time, washes the combined ether extracts with a small amount of water, dries over anhydrous sodium sulfate and evaporates to dryness. The residue of 1.9 g. is used directly as starting material in the above example (see also Angew. Chem. 73, page 94 (1961) with regard to the reduction method).

The formula of the final product (free acid) is:

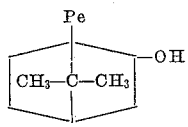

and its activity is similar to that of the final product of the next following Example 6.

*Example 6.—N-ethyl piperidinium salt of 10-nor-camphor-1-yl-penicillin*

1.16 g. of the crude product containing 86.1% of 6-amino-penicillanic acid, used in Example 1, is dissolved in a mixture of 30 ml. chloroform and 2 ml. triethylamine by stirring the components for 30 minutes at room temperature and the solution is cooled to 0 to 5°. 0.92 g. of d,l-ketopinic acid chloride, dissolved in 10 ml. of chloroform, is added dropwise over 5 minutes while the mixture is being stirred, and stirring is subsequently continued for an hour at room temperature. The solution is filtered and the filtrate is evaporated under reduced pressure (water bath temperature 30°) and the residue is taken up in a mixture of 50 ml. of methylisobutyl ketone and 30 ml. of water. The pH of the aqueous solution is adjusted to 2.1 with 10 N sulfuric acid and the phases are separated. The organic layer is washed twice using 5 ml. of water each time and is dried with anhydrous sodium sulfate. It is then cooled to —5 to —10° and mixed with 0.6 ml. N-ethyl piperidine while being vigorously stirred. The precipitating oily N-ethyl piperidinium salt of 10-nor-camphor-1-yl-penicillin is recovered by centrifuging, and the product is dried in high vacuum to form a vitreous colorless mass which can easily be pulverized to a white powder (yield 56%).

When carrying out the above example, but replacing triethylamine by pyridine, similar results are obtained.

The above-mentioned solution of the free acid of the penicillin in methyl-isobutyl ketone can also be extracted with 3%-sodium bicarbonate solution and then further processed as described in Example 1.

The sodium salt thus obtained, as well as the above-described N-ethyl-piperidinium salt of 10-nor-camphor-1-yl-penicillin inhibit the growth of *Staphylococcus aureus* Smith ATCC 13,709 and that of *Staphylococcus lactis* NCTC 8340 at a concentration of 0.1 mcg./ml. and are of similar activity against the aforesaid penicillin-G-resistant strains as the final products of Example 2.

The formula of the free acid, 10-nor-camphor-1-yl-penicillin, [i.e., 6-(7'7'-dimethyl - 2' - oxo-bicyclo[2,2,1]heptane-1'-carboxamido)-penicillanic acid] is

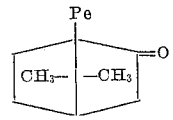

*Example 7.—7,7-dimethyl-bicyclo[2,2,1]heptyl-(1)-penicillin*

Example 2 is repeated with 0.86 g. of 7,7-dimethyl-bicyclo[2,2,1]heptane-1-carboxylic acid, obtained from the free acid, the production of which is described below, and thionyl chloride, and the sodium salt of 7,7-dimethyl-bicyclo[2,2,1]heptyl-(1)-penicillin is obtained with about 70% yield. It possesses similar antibiotic activity as the compounds obtained in Example 1.

The free 7,7-dimethyl-bicyclo[2,2,1]heptane-1-carboxylic acid is obtained as follows:

The oxo group of d,l-ketopinic acid is removed by the method described for diethyl-2,5-dioxo-bicyclo[2,2,2]octane-1,4-dicarboxylate in J. Am. Chem. Soc., 75, pages 637–640 (1953) by first producing the ketopinic acid ethyl ester from ketopinic acid chloride (Example 6), dissolving the ester in the minimum volume of chloroform to obtain complete dissolution, adding a fourfold excess of ethylene dithiol, bubbling a thin stream of hydrogen chloride gas through the mixture for 8 hours while cooling in an ice bath. The solution is washed with 2-normal aqueous sodium hydroxide solution and then with water, dried over anhydrous sodium sulfate and concentrated on a water bath of 70° temperature under water jet vacuum. The residue is mixed with n-hexane, whereby a voluminous white powder (the corresponding ethylene mercaptol) precipitates which is filtered hot and directly treated further as follows:

The precipitate is boiled for 48 hours in a large excess of Raney nickel in 95%-ethyl alcohol under reflux. The Raney nickel is then separated by filtration and the filtrate is evaporated under water jet vacuum, and the residual yellow oil, ethyl-7,7-dimethyl-bicyclo[2,2,1]heptane-1-carboxylate, is saponified by the standard method with ethanolic potassium hydroxide solution to obtain the free acid.

The final product, written in the form of the free acid, has the formula

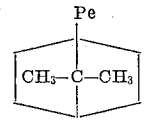

and its antibiotic activity is similar to that of the final products of Example 2.

*Examples 8 to 12*

In an analogous manner to that described in Example 1, there are obtained from the amounts of starting materials named below the corresponding new penicillin derivatives:

| Example No. | Amount (g.) | Starting material | Final Product | Yield, Percent |
|---|---|---|---|---|
| 8 | 1.04 | 2,5-dioxo-bicyclo[2,2,2]octane-1,4-dicarboxylic acid (Ber. 72 1367(1939)). | Disodium salt of 4-carboxy-2,5-dioxo-bicyclo[2,2,2]octyl-(1)-penicillin. | 47 |
| 9 | 0.91 | Bicyclo[2,2,2]octane-1,4-dicarboxylic acid (J. Am. Chem. Soc. 75 638(1953)). | Disodium salt of 4-carboxy-bicyclo[2,2,2]octyl-(1)-penicillin. | ca. 40 |
| 10 | 0.79 | 4-hydroxy-bicyclo[2,2,2]octane-1-carboxylic acid (J. Am. Chem. Soc. 75 639 (1953)). | Sodium salt of 4-hydroxy-bicyclo[2,2,2]octyl-(1)-penicillin. | ca. 50 |
| 11 | 0.85 | Camphenolic acid (Ann. 410, 240 (1915)). | Sodium salt of 2-hydroxy-3,3-dimethyl-bicyclo[2,2,1]heptyl-(1)-penicillin. | ca. 40 |
| 12 | 0.65 | Bicyclo[4,1,0]heptane-1-carboxylic acid. | Sodium salt of bicyclo[4,1,0]heptyl-(1)-penicillin. | ca. 70 |

Examples 13 to 15

| Example No. | Amount (g.) | Starting material | Final Product | Yield, Percent |
| --- | --- | --- | --- | --- |
| 13 | 0.55 | Bicyclo[3,1,0]hexane-1-carboxylic acid produced from cyclopentane carboxylic acid (J. Am. Chem. Soc. 81, p. 4256 (1959)). | Sodium salt of bicyclo[3,1,0]hexyl-(1)-penicillin. | ca. 70 |
| 14 | 0.94 | 7,7-dichloro-bicyclo[4,1,0]heptane-1-carboxylic acid produced from cyclo-hexane-1-carboxylic acid (J. Am. Chem. Soc. 80, p. 5274(1958)). | Sodium salt of 7,7-dichloro-bicyclo[4,1,0]heptyl-1-penicillin. | ca. 30 |
| 15 | 0.88 | 6,6-dichloro-bicyclo[3,1,0]hexane-1-carboxylic acid, from cyclopentane-1-carboxylic acid (J. Am. Chem. Soc. 80, p. 5274 (1958)). | Sodium salt of 6,6-dichloro bicyclo[3,1,0]hexyl-(1)-penicillin. | ca. 30 |

The starting material for Example 12 is produced in accordance with the method of Simmons and Smith, J. Am. Chem. Soc. 81, 4263 (1959), by using 7.0 g. of cyclohexene-1-carboxylic acid ethyl ester instead of the ethyl ester of trans-p-methoxy-cinnamonic acid used by Simmons and Smith, and saponifying the resulting product by heating for four hours in ethanolic potassium hydroxide solution.

The formulas of the compounds of Examples 8 to 15, written in the form of their free acids, are:

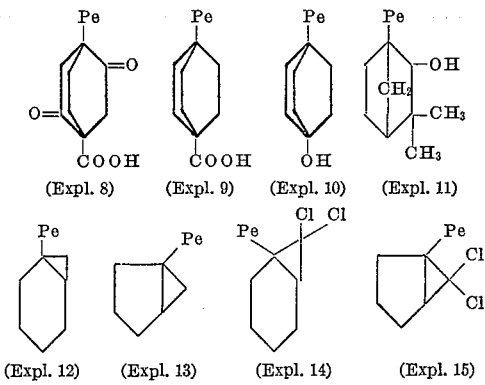

(Expl. 8) (Expl. 9) (Expl. 10) (Expl. 11)
(Expl. 12) (Expl. 13) (Expl. 14) (Expl. 15)

Example 16.—Preparation of trans-decahydronaphthyl-(4a)-penicillin

.083 g. of trans-decahydronaphthalene-(4a)-carboxylic acid obtained as described in J. Am. Chem. Soc., 77, page 48 (1955), and 0.7 ml. triethylamine are dissolved in 12 ml. dioxan and 10 ml. acetone and cooled to 0 to 5°. 1 g. of chloroformic acid-p-nitrobenzyl ester, dissolved in 5 ml. dioxan, is added thereto drop by drop. The solution is stirred at 0 to 5° for 30 minutes and then separated from the triethylamine hydrochloride by filtration. The filtrate is cooled to 0° and a solution of 1.16 g. of the crude product containing 88.1% of 6-amino-penicillanic acid (used in Example 1) in a mixture of 10 ml. of water and 1 ml. of triethylamine is added thereto. The reaction solution is stirred for 60 minutes, some carbon dioxide being liberated. 10 ml. of water containing 1 g. of sodium bicarbonate are added and the whole is washed twice using 25 ml. of ether each time. The aqueous phase is covered with a layer of 20 ml. of methylisobutyl ketone and adjusted to pH 2.1 with 10-normal sulfuric acid. During stirring the major portion of the reaction product passes into the organic phase. The layers are then separated and the aqueous portion is twice extracted using 5 ml. of methylisobutyl ketone each time. All methylisobutyl ketone extracts are combined, washed with 5 ml. of water and dried with sodium sulfate. 1.7 ml. of a butanolic solution containing 0.84 g. of the potassium salt of α-ethyl-caproic acid are then added to this solution. A precipitation, which then begins to form and which can be accelerated by the addition of 150 ml. of cold ether, is separated from the mother liquor by centrifuging and the oily residue is dried in high vacuum. The potassium salt of decahydronaphthyl-(4a)-penicillin [i.e., potassium (6 - decahydronaphthalene - 4a - carboxamido)-penicillanate] obtained in this manner (yield=52% of the theoretical amount) consists of light yellow platelets. The free acid form has the formula

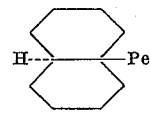

An aqueous solution of the latter compound in a concentration of 0.1 mcg./ml. inhibits the growth of *Staphylococcus lactis* NCTC 8340, and in a concentration of about 10 mcg./ml. of penicillin-G-resistant strains mentioned above.

The calcium salt is obtained via the free acid by the method described in Example 1.

The action of aqueous hydrochloric acid of pH 2 on the sodium salt at room temperature (22°) inactivates the substance during the first three hours only slightly, not exceeding 40%.

Example 17.—Trans-2-hydroxy-decahydronaphthyl-(4a)-penicillin

By repeating Example 16 with 0.91 g. of trans-2-hydroxy-decahydronaphthalene-4a-carboxylic acid, produced in accordance with J. Am. Chem. Soc. 75, 4727 (1953) and 77, 411 (1955), as starting material, there is obtained the sodium salt of trans-2-hydroxy-decahydronaphthyl-(4a)-penicillin with a yield of ca. 25%, and similar activity to that of the final product of Example 16. Its formula written as free acid, is

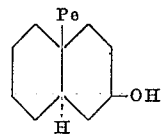

By repeating Example 16 with equimolar amounts of 2-oxo-decahydronaphthalene-4a-carboxylic acid, or the 2-oxo-octahydronaphthalene-carboxylic acid of the formula

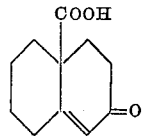

there are obtained the potassium salts of the corresponding penicillins of the formulas

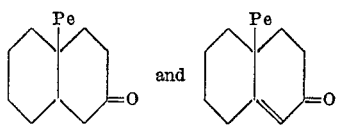

respectively.

Example 18.—4-bromo-bicyclo[2,2,2]octyl-(1)-penicillin

By repeating Example 6 with 1.16 g. of 4-bromo-bicyclo[2,2,2]octane-1-carboxylic acid chloride, which is produced from the free acid (J. Am. Chem. Soc. 75, 639 (1953)) with thionyl chloride by the standard method, instead of the ketopinic acid chloride used therein, and using an aqueous 3%-sodium bicarbonate solution as extractant for the resulting penicillin, there is obtained the sodium salt of 4-bromo-bicyclo[2,2,2]octyl-(1)-penicillin (Yield ca. 60%). The substance inhibits the growth of *Staphylococcus aureus* Smith ATCC 13,709 in the Agar incorporation test, at a concentration of 0.1 mcg./ml., and the aforesaid Penicillin-G-resistant strain 5002 at a concentration of about 10 mcg./ml.

Its formula, written as free acid, is

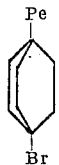

*Examples 19 to 30*

In an analogous manner to that described in Example 18 there are obtained from the starting materials named below the corresponding new penicillin derivatives.

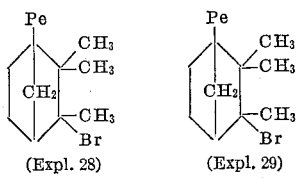

These compounds have antibiotic activity similar to the compounds of the final products of Example 2.

*Example 30*

0.86 g. of 6-methyl-bicyclo[2,2,2]oct-2-ene-1-carboxylic acid chloride is reacted with 1.16 g. of the crude 6-aminopenicillanic acid-containing starting material of Example 6, under conditions of said example, and there is obtained the sodium salt of 6-methyl-bicyclo[2,2,2]oct-2-en-1-yl-penicillin with a yield of about 60%; its antibiotic activity is similar to that of the end product of Example 6.

| Example No. | Amount (g.) | Starting material | Final Product | Yield, Percent |
|---|---|---|---|---|
| 19 | 1.13 | 4-carbethoxy-bicyclo[2,2,2]octane-1-carboxylic acid chloride (J. Am. Chem. Soc. 75, 638 (1953)). | 4-carbethoxy-ci-cyclo[2,2,2]octyl-(1)-penicillin, Na-salt. | 53 |
| 20 | 0.8 | Bicyclo[2,2,2]octane-1-carboxylic acid chloride (J. Am. Chem. Soc. 75, 639 (1953)). | Bicyclo[2,2,2]octyl-(1)-penicillin, Na-salt. | 75 |
| 21 | 0.85 | Tricyclenic acid chloride (Ann. 648, 10 (1961)) | 7,7-dimethyl-tri-cyclo[2,2,1,0 $^{2,6}$]heptyl-(1)-penicillin, Na-salt. | ca. 70 |
| 22 | 0.93 | Camphenonic acid chloride (Ann. 410, 240 (1915)) | 2-oxo-3,3-dimethyl-bicyclo[2,2,1]heptyl-(1)-penicillin, Na-salt. | ca. 40 |
| 23 | 0.93 | Isocamphane-carboxylic acid chloride obtained with thionyl chloride from the free acid (Ber. 59, 2294 (1926) and Ann. 489, 198 (1931)). | Isocamphan-1-yl-penicillin, Na-salt. | |
| 24 | 0.92 | Camphene-4-carboxylic acid chloride, obtained with thionyl chloride from the free acid (Ber. 59, 2293 (1926)). | Camphen-4-yl-penicillin, Na-salt. | |
| 25 | 0.92 | Camphene-1-carboxylic acid chloride, obtained with thionyl chloride from the free acid (Ber. 59, 959 (1926)). | Camphen-1-yl-penicillin, Na-salt. | |
| 26 | 1.65 | 2,2 ¹-dibromo-2,3,3-trimethyl-bicyclo[2,2,1]heptane-1-carboxylic acid chloride obtained with thionyl chloride from the free acid (Ber. 59, 2290 (1926)). | 2,2 ¹-dibromo-2,3,3-trimethyl-bicyclo[1,2,2]heptyl-(1)-penicillin, Na-salt. | |
| 27 | 1.65 | 3,3 ¹-dibromo-2,2,3-tri-methyl-bicyclo[2,2,1]heptane-1-carboxylic acid chloride obtained with thionyl chloride from the free acid (Ber. 59, 2294 (1926)). | 3,3 ¹-dibromo-2,3,3-trimethyl-bicyclo[2,2,1]heptyl-(1)-penicillin, Na-salt. | |
| 28 | 1.3 | 3-bromo-2,2,3-tri-methyl-bicyclo[2,2,1]heptane-1-carboxylic acid chloride obtained with thionyl chloride from the free acid (Ber. 59, 2296 (1926) and Ann. 489, 198 (1931). | 3-bromo-2,3,3-trimethyl-bicyclo[2,2,1]heptyl-(1)-penicillin, Na-salt. | |
| 29 | 1.09 | 3-chloro-2,2,3-trimethyl-bicyclo[2,2,1]heptane-1-carboxylic acid chloride, obtained with thionyl chloride from the free acid (Ber. 59, 2294 (1926) and Ber. 72, 1541 (1939)). | 3-chloro-2,3,3-trimethyl-bicyclo[2,2,1]heptyl-(1)-penicillin, Na-salt. | |

The formulas of the final products of Examples 19 to 29 written as free acids, are:

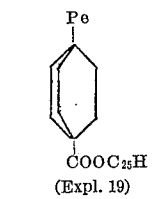 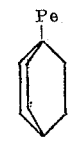 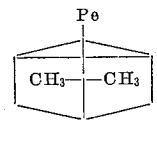

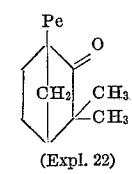 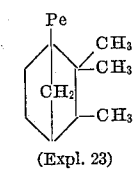 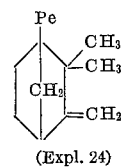

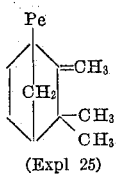 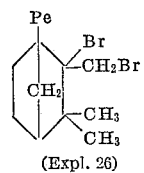 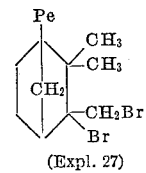

Its formula, written as free acid, is

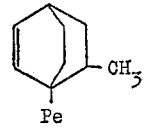

The aforesaid starting acid chloride is obtained by reacting 6-methyl-cyclohexa-1,3-diene - 1 - carboxylic acid (Ann. 525, 43 (1936) in accordance with the method and under the conditions given in J. Org. Chem. 26, 4281 (1961) with gaseous ethylene, 5 g. of the sodium salt of the aforesaid acid (viz. Ber. 86, 1312 (1953)) being employed in lieu of the substituted anthracene used in J. Org. Chem. supra. After heating for 48 hours at 180°, there is obtained the free 6-methyl-bicyclo[2,2,2]oct-2-ene-1-carboxylic of the M.P. 70–71° which is directly reacted with thionyl chloride under standard conditions to the acid chloride.

*Example 31*

Example 6 is repeated employing 0.79 g. of bicyclo[2,2,2]oct-2-ene-1-carboxylic acid chloride in lieu of ketopinic acid chloride, and there is obtained the sodium salt of bicyclo[2,2,2]oct-2-en-1-yl-penicillin with a yield of about 65%, and an antibiotic activity similar to that of the final product of Example 6. Its formula, written as free acid, is

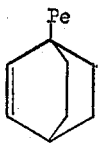

The aforesaid starting material is produced from the corresponding cyclohexa-1,3-diene-1-carboxylic acid (Ber. 75, 232 (1942)) in the manner described in Example 30 supra.

*Example 32*

By repeating the ring expansion reaction described in Chem. Ber. 92, p. 1634 (1959), but starting from tricyclo[4,3,1,1$^{3,8}$]undecane-3-carboxylic acid, and using 1 g. of the resulting tricyclo[5,3,1,1$^{4,9}$]dodecane - 4 - carboxylic acid, of the formula

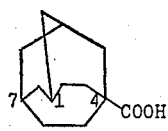

carrying out the procedure described in Example 3, there is obtained the sodium salt of tricyclo[5,3,1,1$^{4,9}$]dodecyl-4-penicillin (yield ca. 5% based on tricyclo[4,3,1,1$^{3,8}$]undecane-3-carboxylic acid).

In another aspect, this invention concerns the compounds of the formula

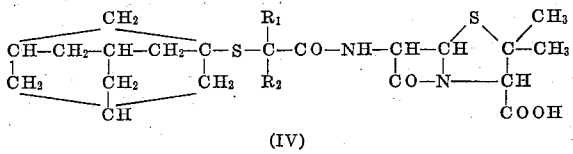

(IV)

wherein R$_1$ represents hydrogen, alkyl, preferably with from 1 to 5 carbon atoms, cycloalkyl, preferably with 5 or 6 carbon atoms, or mononuclear carbocyclic aryl, particularly phenyl, lower alkyl-phenyl, chlorophenyl, bromophenyl, lower alkoxyphenyl, cyanophenyl or trifluoromethylphenyl;

R$_2$ represents hydrogen or a lower alkyl radical; and the salts of these compounds obtained by neutralization of the free acid of Formula IV with inorganic and organic bases. These novel compounds possess an excellent antibacterial action against gram-positive bacteria, low hygroscopicity and high heat resistance. Their antibacterial action also extends to strains of the aforesaid bacteria which are resistant to Penicillin G.

"Lower" as used herein in connection with "alkyl" and the like radicals means "with 1 to 4 carbon atoms unless stated otherwise."

The new compounds of Formula IV are produced by a process according to the invention, which comprises:

(A) reacting (1) a reactive ester of a hydroxyl compound of the formula

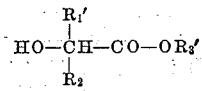 (V)

wherein

R$_1'$ represents hydrogen, an aliphatic, cycloaliphatic or aromatic radical,

R$_2$ represents hydrogen or a lower alkyl radical, and

R$_3'$ represents a lower alkyl radical, for example the bromide, the chloride, the lower alkane, especially methane sulfonic acid ester or the p-toluene sulfonic acid ester of a compound of Formula V with heating preferably at 60° to 200° C. and advantageously with the exclusion of air, in a suitable inert organic solvent particularly diethylene glycol dimethyl ether; and (2) a reactive salt of 1-adamantanethiol, in particular the alkali metal salts thereof, which may be formed in situ, or the silver, lead or mercury salts of 1-adamantanethiol, whereby the corresponding (α-adamant-1-ylthio)-carboxylic acid alkyl ester is obtained;

(B) saponifying the latter compound, for example by moderate heating in an alkanolic alkali liquor, and then, if desired, isolating the free acid by acidification, for example with aqueous hydrochloric acid, thereby obtaining the corresponding free adamantylthio alkanoic acid of the formula

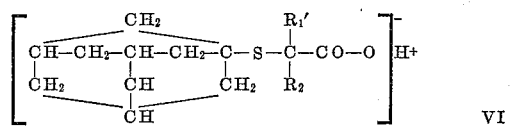

VI wherein R$_1'$ and R$_2$ have the meanings given hereinbefore; or, depending on the nature of the alkaline medium and the base used, the corresponding salt of said acid;

(C) reacting the free acid of Formula VI, if desired, with (α) thionyl chloride, phosphorus pentachloride, phosphorus oxychloride or phosphorus oxybromide at a temperature between room temperature (20° C.) and reflux temperature, depending on the stability of the acid involved, and, when necessary, a hydrocarbon solvent such as benzene, in order to produce the corresponding acyl chloride or bromide, or (β) with acetic acid anhydride or thionyl chloride, with heating between 40° C. and reflux temperature of the mixture in order to produce either a mixed anhydride of the acid of Formula VI and acetic acid or the anhydride of the acid of Formula VI, or (γ) with a chloroformic ester of the formula

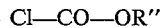

Cl—CO—OR'' wherein R'' is lower alkyl, especially ethyl or isobutyl, or benzyl, p-nitro benzyl, allyl or methallyl, at about 0° C., thereby obtaining so-called "mixed anhydrides" of the acids of the Formula VI which are carbonic acid esters of the formula

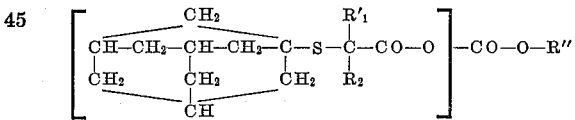

wherein R$_1'$, R$_2$ and R'' have the aforesaid meanings;

(D) reacting the free acid of Formula VI obtained in step B, or one of the reaction products of step (C)(α), (β) or (γ) with 6-amino-penicillanic acid, namely, more in detail:

(1) halides, anhydrides and mixed anhydrides at room temperature, or, if necessary with cooling to about 0° C. in the presence of acid-binding agents, in particular in the presence of sodium or potassium bicarbonate, -carbonate or -hydroxide in aqueous organic or inorganic medium, and tertiary organic bases such as triethylamine or pyridine in organic medium, for example in dioxan, tetrahydrofuran, acetone or chloroform;

(2) the free acids of Formula VI above in the presence of water-binding agents, such as dicyclohexyl carbodiimide, diisopropyl carbodiimide and the like di-alkyl and di-cycloalkyl carbodiimides wherein alkyl and cycloalkyl have each about 3 to 6 carbon atoms, at the temperatures mentioned above under D(1);

(E) isolating the reaction products from steps (D)(1) or (2) from the respective aqueous organic media, for example, by acidifying in the cold and extracting the 6-acylamino-penicillanic acid with a water-immiscible organic solvent such as methylisobutylketone, ethyl acetate, n-amyl-acetate, or the like;

(F) extracting the last-mentioned acid from said solvent, for example, with an aqueous sodium or potassium bicarbonate or carbonate solution, whereupon the resulting aqueous solution of the sodium or potassium salt of 6-acylamino-penicillanic acid can be evaporated in vacuo at low temperatures, or, preferably lyophilized.

When $R_1'$ and $R_2$ in the Formula IV are different from each other, the products are obtained as racemates which can be separated if desired into their antipodes in a conventional manner. Preferably, the separation is realized by reacting the racemic acids of the Formula VI with optically active organic bases, for example, with (+) or (−)-α-phenyl-ethyl-amine in suitable solvents such as aqueous ethanol. The precipitated optically active salt is recrystallized and, if desired, the optically active acid is liberated, and then further reacted as described above.

For producing salts having organic bases, the latter can be reacted, for example, with the free acids in organic solvents or the alkali salts of the acids can be brought together in water with salts of the organic bases, for example the hydrochlorides, and the precipitated salts can be separated and dried.

The isolation of salts of 6-acylamino-penicillanic acid from organic reaction media can be carried out either directly by extraction with aqueous sodium or potassium bicarbonate solutions or by precipitation with organic bases.

The 1-adamantanethiol, which is used as starting material, is prepared for example by boiling the known 1-bromo-adamantane with thiourea in a mixture of glacial acetic acid and hydrobromic acid, followed by hydrolysis of the S-(1-adamantyl)-isothiuronium bromide obtained, for example, by means of heavily diluted caustic soda. The S-(1-adamantyl)-isothiuronium bromide may furthermore be obtained, for example, by reacting the known 1-adamantanol with thiourea and hydrobromic acid.

In compounds of Formulas V and VI, $R_1'$ is for example hydrogen, a methyl, ethyl, n-propyl, isopropyl, n-butyl, secondary butyl, isobutyl, tertiary butyl, n-amyl or isoamyl radical, an alkyl radical bridged by oxygen or sulfur, such as the β-ethoxyethyl or γ-methylthio-propyl radical, an alkenyl radical such as the allyl or methallyl radical, a cycloalkyl or cycloalkenyl radical such as the cyclopropyl, cyclobutyl, cyclopentyl, cyclohexyl, cycloheptyl, cyclohexyl-methyl, 2,5-endomethylene-cyclohexyl, cyclooctyl, 2,5-endomethylene-cyclohexylmethyl, 1- or 2-cyclohexenyl or 2,5-endomethylene-3-cyclohexenyl radical, an aryl or substituted aryl radical such as the phenyl, p-tolyl, 3,4-dimethylphenyl p-isopropyl-phenyl, m- or p-fluoro-phenyl, m- or p-chloro-phenyl, p-bromo-phenyl, m- or p-trifluoromethyl-phenyl, p-methoxy-phenyl, p-ethoxy-phenyl, p-isopropoxy-phenyl, 3,4-dimethoxy-phenyl, 3,4,5-trimethoxy-phenyl, 3,4-methylenedioxy-phenyl, m-nitro-phenyl, p-nitro-phenyl, p-methylsulfonyl-phenyl or β-naphthyl radical, an aralkyl or substituted aralkyl radical such as the benzyl, o-, m- or p-methyl-benzyl, p-isopropyl-benzyl, p-fluoro-benzyl, p-chloro-benzyl, p-methoxy-benzyl, 3,4-dimethoxy-benzyl, 3,4,5-trimethoxy-benzyl, 3,4-methylenedioxy-benzyl, α-phenyl-ethyl, β-phenyl-ethyl or γ-phenyl-propyl radical, or an aryloxyalkyl or arylthioalkyl radical, which may be substituted, such as the β-phenoxy-ethyl or β-phenylthio-ethyl radical. $R_2$ is for example hydrogen or one of the above mentioned lower alkyl radicals and $R_3'$ in Formula V is, for example, one of the above mentioned alkyl radicals, in particular a methyl or ethyl radical.

Another method leading to the esters of the acid represented by Formula VI consists in reacting compounds of the formula

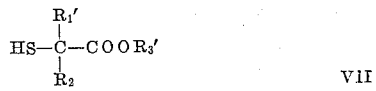

VII wherein $R_1'$, $R_2$ and $R_3'$ have the significance indicated in the Formulae IV and V, with reactive esters of 1-adamantanol in the presence of acid binding agents. The reaction may, for example, be carried out at temperatures between 100 and 180° in an excess of the reaction partner of the Formula VI or in an inert organic solvent.

The reactive 1-adamantanol esters should preferably be 1-bromo-adamantane, and also 1-chloro- or 1-iodo-adamantane, 1-adamantanol-p-toluene sulfonate, -methylsulfonate or trifluoro-acetate.

An amount of a tertiary organic base, which is equivalent to the quantity of the reactive 1-adamantanol ester may serve as an acid-binding agent, preferably triethylamine, pyridine and collidine.

Salts of the free acid of Formula VI obtained either directly from the alkaline phase (described in step (B)), or by neutralization of the free acid, or by exchange of cations of the said salts for those of another inorganic or organic base, are, for example, the sodium, potassium, lithium, ammonium, ethyl ammonium, triethyl ammonium, piperidinium, ethanol ammonium, diethanol ammonium, or N,N-diethylethanol ammonium salts or the corresponding magnesium, calcium or ethylenediammonium salts in which one equivalent weight of the latter cations is neutralized by two equilvalent weights of the anion of the acid of Formula VI.

These salts are starting intermediates for the next following steps, in that they can be isolated in a conventional manner and then used for preparing the free acid therefrom in a pure form, which can then be reintroduced into step (C) of the above-described process according to the invention.

Sodium, potassium, lithium, ammonium, magnesium or calcium salts, or salts of organic bases such as ethylamine, diethylamine, triethylamine, ethanolamine, diethanolamine, N-ethyldiethanolamine, diethylaminoethanol, pyrrolindine, piperidine, N-ethyl-piperidine, 1-(β-hydroxyethyl)-piperidine, morpholine, procaine, benzylamine, dibenzylamine, 1-phenylpropyl-(2)-amine and other amines, which are often used for producing penicillin salts, are salts of acids of the Formula IV which may be produced in accordance with the invention.

The compounds according to this aspect of the invention are stable against mineral acids: for instance, aqueous hydrochloric acid of pH 2 acting on these compounds for three to ten hours at 20 to 25° C. decomposes less than 50% thereof.

The following non-limitative examples further illustrate the preparation of the compounds of this aspect of the invention more in detail. The temperatures are given therein in degrees centigrate.

*Example 33*

(a) 107 grams (g.) (0.5 mol) of 1-bromo-adamantane are boiled for three hours under reflux with 76 g. (1 mol) of thiourea and 250 milliliters (ml.) of hydrobromic acid 48% in 500 ml. of glacial acetic acid. The hot reaction mixture is poured onto approximately 1800 g. of ice. The precipitated 1-adamantyl-isothiuronium-bromide is separated on a suction filter and washed with water and then with methylene chloride. It is then shaken for approximately 14 hours at room temperature with 40 g. sodium hydroxide in 1000 ml. of water and 250 ml. of ethanol. The reaction product is separated on a suction filter, dissolved in benzene, the benzene solution is washed with water and the solvent evaporated. The 1-adamantanethiol, which remains behind as an oil, crystallizes upon trituration with pentane. It is then purified by means of sublimation at 110° under a pressure of 12 torr; the pure substance melts at 100–102°.

(b) A suspension of 6 g. (0.15 mol) of sodium amide in toluene (total volume 18 ml.) is added gradually to a solution of 16.8 g. (0.1 mol) of 1-adamantanethiol in 250 ml. of diethyleneglycol dimethylether at a bath temperature of 150° while being stirred in an atmosphere of nitrogen, and the mixture is vigorously refluxed for three hours 34 g.=24 ml. (0.2 mol) of ethyl α-bromoacetate is then added drop by drop for 30 minutes at the same temperature and boiled for approximately a further 14 hours. After cooling, the reaction mixture is poured onto about 1 kilogram of an ice-water mixture and then extracted with toluene. The toluene solution is washed several times with water, and the toluene is evaporated in a rotary evaporator at reduced pressure.

The oily residue which consists of ethyl α-(adamant-1-ylthio)-acetate is purified by means of distillation in high vacuum. At a pressure of 0.001 torr it distills over at 117–118°.

(c) In order to obtain the free acid, the oily crude ester, produced as described above is refluxed with 20 g. of sodium hydroxide in 400 ml. of ethanol for 5 hours. The ethanol is distilled off, the residue mixed with approximately 750 ml. of water and the aqueous phase is filtered through Hyflo. The filtrate is acidified with hydrochloric acid, the precipitated oil taken up in benzene-ether, the solution evaporated, the residue dissolved in 1000 ml. of 0.2 N aqueous sodium hydroxide solution, the solution is clarified with active carbon and filtered through Hyflo. On acidifying with hydrochloric acid, the α-(adamant-1-ylthio)-acetic acid initially precipitates in an oily form, but soon becomes solid. It is separated on a suction filter, washed to neutral with a large quantity of water and then dissolved in benzene. The benzene solution is dried with sodium sulfate. After evaporating the solvent, α-(adamant-1-ylthio)-acetic acid remains as an oil and is crystallized from hexane/pentane. Melting point 68–70°.

(d) 1.05 g. of (adamant-1-ylthio)-acetic and 0.7 ml. of triethylamine are dissolved in 12 ml. of dioxan and 10 ml. of acetone and cooled to a temperature between 0° and 5°. 0.62 ml. of isobutyl chloroformate, dissolved in 5 ml. of dioxan, are added thereto drop by drop, the whole is stirred for 15 minutes at 0° and then separated from residual triethylamine-hydrochloride by filtration. A solution of 1.16 g. of 6-aminopenicillanic acid (86.1%—pure) in 10 ml. of water and 1 ml. of triethylamine is added to the filtrate which is cooled to 0°. The reaction solution is stirred for 60 minutes at room temperature. 10 ml. of water containing 1 g. of sodium bicarbonate dissolved therein are then added and the whole is washed twice using 25 ml. of ether each time. The aqueous phase is covered with a layer of 20 ml. of methylisobutyl ketone and adjusted to pH 2.1 with 10 N sulfuric acid. Stirring causes the largest part of the reaction product to pass into the organic phase as free acid. The layers are separated and the aqueous phase is extracted once more using 5 ml. of methylisobutyl ketone. The methylisobutyl ketone extracts are combined, washed with 5 ml. of water and dried with sodium sulfate. The methyl isobutyl ketone solution is now shaken with a 3%-sodium bicarbonate solution until the aqueous phase has attained a pH of 6.8–7.0. The phases are separated and the organic phase is again extracted with 5 ml. of water. The combined aqueous phases are washed with 25 ml. of ether and liberated from dissolved ether in a rotary evaporator under reduced pressure. The clear and almost colorless solution of the resulting sodium salt of (adamant-1-ylthio)-methylpenicillin is lyophilized.

There is obtained a white, voluminous powder, the antibiotic activity of which is determined in near accordance with the agar-incorporation test described by Florcy et al. in "Antibiotics," published by Oxford University Press 1949, especially pages 201–203. In this test, a culture of microorganisms grown at 37° C. for 24 hours is transferred with the aid of a velvet-covered sterile stamper to a series of sterile agar plates containing the antibiotic to be tested in varying concentrations. The inoculated plates (sub-cultures) are then incubated at 37° C. for 24 hours. That concentration of the antibiotic at which growth of the respective bacterium is completely inhibited is called the "minimum inhibitory concentration."

The aforesaid final product inhibits the growth of *Staphylococcus aureus* NCTC 7447 in the above described agar incorporation test at a concentration of less than 0.01 microgram per milliliter (μg./ml.).

*Example 34*

(a) 36 g. (0.2 mol) of ethyl α-bromo-propionate are converted to the crude ethyl α-(adamant-1-ylthio)-propionate in the same manner as described in Example 33 under (b), and the crude ethyl α-(adamant-1-ylthio)-propionate is boiled under reflux for approximately 14 hours with 16 g. of sodium hydroxide in 250 ml. of ethanol. The solid residue, which remains after the ethanol has been evaporated, is taken up in 250 ml. water, the resulting aqueous solution is extracted with methylene chloride, in order to remove the neutral components, it is then purified with charcoal, filtered and the filtrate acidified with concentrated hydrochloric acid. The resulting precipitate of α-adamant-1-ylthio)-propionic acid is separated on a suction filter, recrystallized from cyclohexane and then from benzine, and then dried in high vacuum at 50° for 14 hours. Melting point 142–144°.

(b) 1.2 g. of α-(adamant-1-ylthio)-propionic acid (=8% excess calculated on 6-amino penicillanic acid) is dissolved in 5 ml. of thionyl chloride and boiled under reflux for 30 minutes. The excess thionyl chloride is evaporated in vacuo, the residue is dissolved in benzene and the latter solvent evaporated, leaving a residue which is dried in high vacuum (0.01 torr) for one hour and the resulting crude acid chloride is subsequently used without purification for the following reaction.

(c) 1.16 g. of 6-aminopenicillanic acid (86.1% pure) is dissolved in 25 ml. of water containing 3 g. of sodium bicarbonate, the solution is cooled to 0 to 5° in an ice bath, and the acid chloride produced under (b) supra, dissolved in 20 ml. acetone, is added thereto drop by drop with vigorous stirring. After the addition, which takes about 10 minutes, the ice bath is removed and the reaction mixture is stirred for 60 minutes at room temperature. The solution is now extracted with two times 10 ml. of ether and then covered with a layer of 20 ml. of methyl isobutyl ketone. The pH of the aqueous phase is adjusted to 2.1 by adding aqueous 10 N-sulfuric acid. The free acid of α-(adamant-1-ylthio)-ethyl penicillin passes over into the organic phase. The layers are separated and the aqueous phase is extracted once with 5 ml. of methyl isobutyl ketone. The methyl isobutyl ketone solutions are combined and washed with 5 ml. of water. The sodium and the potassium salts of the α-(adamant-1-ylthio)-ethyl-penicillin[sodium, or potassium, 6-(2'-[adamant-1''-ylthio]-propionamido)-penicillanate] are obtained from the free acid in an analogous manner as described in Example 33, by extraction with aqueous sodium bicarbonate solution, respectively.

Its activity is the same as that of the final product of the preceding example.

*Example 35*

In the same manner described as in Example 33, step (b), the crude α-(adamant-1-ylthio)-n-caproic acid ethylester is obtained by using 45 g. (0.2 mol) α-bromocaproic acid ethylester instead of the ethyl α-bromoacetate used therein. The crude caproate is boiled under reflux for 6 hours with 20 g. of sodium hydroxide in 400 ml. of ethanol. After evaporation of the solvent, the residue is dissolved in 250 ml. of water and purified by filtration through Hyflo. The filtrate is acidified with hydrochloric acid, the precipitated oil taken up in toluene, and the toluene solution washed with water and the solvent evaporated. The resulting residue is then dissolved in cyclohexane, and this solution is thoroughly shaken several times with a saturated potassium bicarbonate solution until no more carbon dioxide is liberated. The cyclohexane solution is extracted with a sodium carbonate solution, the solution obtained is filtered through Hyflo after the addition of charcoal, the filtrate is acidified with hydrochloric acid and the precipitated oil is taken up in etherhexane.

The ether-hexane solvent is evaporated from the resulting solution and the residue is recrystallized from aqueous 80%-methanol at −5°. The crystals of α-(adamant-1-ylthio)-n-caproic acid are made into a paste with 50 ml. methanol 80% at −10°, the excess liquor is separated on a suction filter and the residue dried at 55° in high vacuum (0.001 torr). Melting point 74–76°.

The corresponding penicillin, namely α-(adamant-1-ylthio)-n-amyl-penicillin, is produced from α-(adamant-1-ylthio)-n-caproic acid in the same manner as described in Example 33, step (d). It inhibits the growth of *Staphylococcus aureus* NCTC 7447 in the agar incorporation test at a concentration of 0.1 µg./ml.

*Example 36*

By using 39 g.=29.5 ml. (0.2 mol) of α-bromo-butyric acid ethylester, instead of the corresponding ethyl bromoacetate of Example 33 and proceeding in the same manner as described in Example 33, step (b), the crude α-(adamant-1-ylthio)butyric acid-ethylester is obtained. The latter is boiled under reflux for 5 hours with 16 g. sodium hydroxide in 250 ml. of ethanol, the ethanol solvent is distilled off, the residue dissolved in 500 ml. of water, the solution purified with charcoal and filtered through Hyflo. The filtrate is acidified with concentrated hydrochloric acid and extracted with benzene. The benzene solution is washed with water three times, dried with sodium sulfate and evaporated. The α-(adamant-1-ylthio)-butyric acid, which remains, is recrystallized from approximately 300 ml. of benzine and dried at a pressure of 12 torr. Melting point 113–114°.

α-(Adamant-1-ylthio)-propyl-penicillin (sodium salt) is produced from α-(adamant-1-ylthio)-n-butyric acid in the manner indicated in Example 35. In the agar incorporation test, it inhibits the growth of *Staphylococcus aureus* NCTC 7447 at a concentration of 0.1 µg./ml.

*Example 37*

(a) In the same manner as in Example 33, step (b), the crude α-(adamant-1-ylthio)-isovaleric acid ethylester is prepared by using 42 g. (0.2 mol) α-bromo-isovaleric acid ethylester instead of ethyl bromoacetate, and is boiled under reflux for 5 hours in 20 g. of sodium hydroxide in 300 ml. of ethanol. The ethanol is distilled off, the residue dissolved in 1000 ml. of water, the solution purified with charcoal, filtered through Hyflo and then acidified with concentrated hydrochloric acid. The α-(adamant-1-ylthio)-isovaleric acid precipitates initially as an oil, but soon solidifies. It is filtered off, pulverized, washed with water and then dissolved in benzene. The benzene solution is dried over anhydrous sodium sulfate and the solvent evaporated. The residue is decolorized with charcoal and recrystallized from 250 ml. of benzine and from 300 ml. of hexane and dried for 2 hours in high vacuum at 90°. (0.001 torr.) Melting point 134–135°.

(b) In exactly the same manner as described in Example 34, the acid chloride is produced from 1.4 g. of α-adamant-1-ylthio)-isovaleric acid (=12% excess calculated on 6-amino-penicillanic acid). The well dried product has a melting point of 45–45.5°, after one crystallization from petrol ether.

(c) 1.16 g. of 6-aminopenicillanic acid 86.1% is suspended in 30 ml., of anhydrous chloroform and 2 ml. of triethyl amine and stirred for 30 minutes at room temperature. The solution is filtered and cooled to 0°. The aforesaid acid chloride, which is dissolved in 10 ml. chloroform, is added thereto drop by drop during 5 minutes and the reaction mixture is stirred for one hour at room temperature. The solvent is removed from the clear, pale yellow solution in a rotary evaporator (water bath temperature 25°) and the residue is taken up in 30 ml. of water and 50 ml. of methyl isobutyl ketone. The pH of the aqueous portion is adjusted to 2.1 with 10 N sulfuric acid and the phases are separated. The aqueous layer is extracted with 5 ml. of methyl isobutyl ketone. As is described in Example 34 the sodium salt of α-adamant-1-ylthio)-isobutyl-penicillin is extracted by shaking with an aqueous 3%-sodium bicarbonate solution and the extract lyophilized. The product, an almost white amorphous powder, has a purity of 92% according to microanalytical data, and a purity of 85% or better, according to iodometric titration and pK determination. In the agar incorporation test it shows the following minimum inhibitory concentrations against Staphylococcus ($R$=highly resistant, $r$=weakly resistant, $s$=sensitive to penicillin G):

| Staphylococcus strain: | Concentration in µg./ml. |
|---|---|
| *Aureus* Geigy 5001 R | 1 to 10 |
| *Aureus* Geigy 5002 r | 1 |
| *Aureus* Geigy 5003 R | 10 |
| *Aureus* Geigy 5005 r | 1 |
| *Lactis* NCTC 8340 s | 0.1 |
| *Aureus* Smith s | 0.1 to 1 |

In the agar cup diffusion test, the following inhibition zones (in mm.) result with 1 µg. of substance per cup:

| Staphylococcus strain: | Inhibition zones in mm. |
|---|---|
| *Aureus* Geigy 5001 R | 22 |
| *Aureus* Geigy 5002 r | 24 |
| *Aureus* Geigy 5003 R | 21 |
| *Aureus* Geigy 5005 r | 24 |
| *Lactis* NCTC 8340 s | 42 |
| *Aureus* Smith s | 33 |

In the infra-red spectrum (potassium bromide) the substance shows bands at 3.45, 3.53, 5.65, 6.00, 6.22, 6.65, 6.90, 7.15, 7.60, 8.90, 9.60 and 10.25µ. The band at 5.65µ indicates the presence of a β-lactam ring.

It can be effectively dissolved in the following solvents: dimethyl-formamide, N,N-dimethylacetamide, methanol, ethanol and other lower alcohols, methylene chloride, chloroform, tetrahydrofuran and pyridine; it is somewhat less soluble in glycerine, benzene, chlorobenzene, ethyl acetate, diethylene glycol diethyl ester, ethyl acetoacetate, acetone and dioxan; and is insoluble in ether, carbon tetrachloride and petroleum ether.

The optical rotation amounts to: $[\alpha]_D^{24}$+151° ($c.$=1 in water). In the thin layer chromatogram (silica gel G buffered with 0.1 m. NaH$_2$PO$_4$) a single spot is shown in the system cyclohexane/ether8methanol 90:20:30. R value in relation to penicillin G (sodium salt)=1.64 (=R$_f$ value of the new penicillin derivative divided by R$_f$ value of penicillin G).

On replacing 1.4 g. of α-(adamant-1-ylthio)-isovaleric acid, which represents a racemate, by a corresponding amount of one of the two antipodes, the optically pure α-(adamant-1-ylthio)-isobutyl penicillins are obtained.

The antibacterial activity of the penicillin obtained from the positive rotating acid is remarkably higher than the activity of the diastereoisomer.

*Example 38*

The α-(adamant-1-ylthio)-isobutyric acid (from hexane) having a melting point of 141–142° is obtained, in exactly the same manner as described in the preceding Example 37, by using 39 g. (0.2 mol) of α-bromo-isobutyric acid-ethylester.

α-(adamant-1-ylthio)-isopropyl-penicillin, which inhibits the growth of *Staphylococcus aureus* NCTC 7447 at a concentration of 0.1 µg./ml., is obtained from α-(adamant-1-ylthio)-isobutyric acid (melting point 141–142°, from hexane).

*Example 39*

In the same manner, using α-bromo-β,β-dimethyl-butyric acid ethyl ester, the α-(adamant-1-ylthio)-β,β-dimethyl butyric acid is obtained. Recrystallized from benzine, it has a melting point of 207–208°.

The latter is then converted by a treatment analogous to that described in Example 33 step (d), to the α-(adamant-1-ylthio)-β,β-dimethyl-propyl-penicillin, of similar antibacterial activity as the penicillin derivatives described in the preceding examples.

Example 40

The crude α-(adamant-1-ylthio)-α-cyclopentyl-acetic acid-ethylester, which is obtained in the same manner as described in Example 33, step (b), by using 40 g. (0.17 mol) of α-bromo-α-cyclopentyl-acetic acid-ethylester, is refluxed for 6 hours with 20 g. of sodium hydroxide in 400 ml. of ethanol. The ethanol is filtered through Hyflo, buffered with carbon dioxide to pH 8 and filtered again with addition of charcoal. The filtrate is acidified to pH 6 using concentrated hydrochloric acid, the precipitate filtered and taken up in benzene-ether and the resulting solution extracted three times with 100 ml. of potassium carbonate solution, each time. The benzene-ether solution is evaporated and the residue is decolorized with charcoal and recrystallized twice from approximately 250 ml. hexane. The α-(adamant-1-ylthio)-α-cyclopentyl-acetic acid obtained in this manner has a melting point of 136–139°.

α-(adamant-1-ylthio)-α-cyclopentyl-acetic acid is then converted to [α-(adamant-1-ylthio)-α-cyclopentyl-methyl]-penicillin with a good degree of purity by the method described in Example 33, step (d). It inhibits the growth of *Staphylococcus aureus*, Geigy 5001 and Geigy 5003 strains (both highly resistant to penicillin G), at a concentration of 10 μg./ml. or less.

Example 41

The N-ethyl-piperidinium-salt of α-(adamant-1-ylthio)-isobutyl penicillin is obtained, for example, in the following manner:

300 mg. of the sodium of α-(adamant-1-ylthio)-isobutyl penicillin is dissolved in 10 ml. of water and covered with a layer of 40 ml. of ether. The whole is cooled in an ice bath and the aqueous solution is acidified with stirring (pH 2.1). The layers are separated and the aqueous layer is extracted with 5 ml. of ether. The combined ether extracts are washed twice using 3 ml. of water each time and dried with sodium sulfate. The solution is cooled to −15° to −20° and a solution of 70 mg. of N-ethyl-piperidine in 3 ml. of ether is added slowly. The N-ethyl-piperidinium salt, precipitating in fine droplets, is liberated by means of centrifuging from the mother liquor and is dissolved in 5 ml. of dioxan. The dioxan is removed in high vacuum at a low temperature, a white hygroscopic powder remaining. In in vitro tests, it shows the same activity as the corresponding sodium salt (see Example 37).

Example 42

The 1-phenyl-propyl-(2)-ammonium salt of α-adamant-1-ylthio)-isobutyl-penicillin is easily obtained in pure form in the following manner:

300 mg. of the sodium salt of α-(adamant-1-ylthio)-isobutyl penicillin are dissolved in 3 ml. of water and cooled in an ice bath. A solution of 105 mg. of 1-phenyl-propyl-(2)-aminehydrochloride in 3 ml. of water is added drop by drop. The flaky, white precipitate, which forms immediately, is recovered by means of centrifuging or by rapid filtration under suction. It is dissolved in absolute benzene and the solution is lyophilized. The white powder, which forms in an almost quantitive yield, is sparingly soluble in water, but easily soluble in organic solvents. It has the same effect (in in vitro tests) against Staphylococci as the corresponding sodium salt (see Example 37).

Example 43

When 34 g. (1.2 mol) of 1-adamantanethiol in 500 ml. of warm 95% ethanol are added to a mixture of 38 g. (0.1 mol) of lead acetate, $(CH_3COO)_2Pb \cdot 3H_2O$, in 500 ml. of the same solvent, the yellow lead salt precipitates. After cooling to 0° it is filtered off and washed with ethanol. After drying the precipitate at 50° in high vacuum the yield of lead salt is 52 g. 34 g. (0.063 mol) of this salt and 38 g. (0.156 mol) of α-bromophenyl-acetic acid ethyl ester in 750 ml. of absolute dioxan are refluxed for 60 hours. After cooling and filtration the filtrate is evaporated, the residue treated with hexane and separated from insoluble sludge by filtration. The filtrate is concentrated and the remaining bromoester is distilled off in high vacuum. The distillation residue (22 g.) is refluxed for 16 hours with 100 ml. of ethanol and 5 g. of sodium hydroxide. The ethanol is evaporated and the residue is treated with 500 ml. of water. The aqueous phase is filtered through charcoal. The filtrate is acidified with hydrochloric acid. The viscous precipitate is extracted with ether/benzene and evaporated. After extraction of the residue with diluted sodium bicarbonate solution and purification with charcoal, acid is added. The resulting precipitate is recrystallized from cyclohexane/hexane to give the α-(adamant-1-ylthio)-phenylacetic acid. Melting point 122–124°.

α(Adamant-1-ylthio)-phenyl-methyl-penicillin which is obtained from α-(adamant-1-ylthio)-phenyl acetic acid as described in the preceding example, inhibits at a concentration of 0.1 μg./ml. the growth of *Staphylococcus aureus* NCTC 7447.

Similar results can be obtained by using one of the two enantiomeric acids instead of the racemate mentioned above.

Example 44

Separation of a racemic acid: 26.8 g. of α-(adamant-1-ylthio)-isovaleric acid (obtained according to Example 37) and afterwards 12.1 g. of (+)-α-phenyl-ethyl-amine (an excess of 0.5 g.) are dissolved in 250 ml. of 50% ethanol while stirring and heating. Then the solution is left to stand in an ice bath. The precipitated salt is filtered off with suction and recrystallized three times from 50% ethanol (200 ml., 150 ml., 100 ml., respectively). Thereupon the optical rotation of the salt is $[\alpha]_D^{25} + 35.8$ (c.=2.003 in ethanol).

To liberate the acid the salt which has been recrystallized three times is dissolved in 50 ml. of ethanol, the solution is acidified with 2 N hydrochloric acid and thereupon 200 ml. of water are added. The precipitated acid is filtered off with suction, washed and dried. After recrystallization from 35 ml. of hexane, the optical rotation of the resulting (+)-α-(adamant-1-ylthio)-isovaleric acid is $[\alpha]_D^{24} + 39.6°$ (c.=1.995 in ethanol).

The combined mother liquors of the four recrystallizations are acidified with concentrated hydrochloric acid and diluted with water to double the volume. The precipitated acid is filtered off with suction, washed with water and dried. The acid and afterwards 10.4 g. of (−)-α-phenyl-ethyl-amine are dissolved in 50% ethanol while heating and stirring. Then the solution is left to stand in an ice bath. The precipitated salt is recrystallized twice from 50% ethanol (150 ml.; 100 ml. respectively), $[\alpha]_D^{24} - 33.3°$ (c.=2.008 in ethanol). The twice recrystallized salt is dissolved in 50 ml. of ethanol, the solution is acidified with 2 N hydrochloric acid and diluted with 200 ml. of water. The precipitated acid is filtered off by suction, washed and dried. After recrystallization from 35 ml. of hexane, the optical rotation of the resulting (−)-α-(adamant-1-ylthio)-isovaleric acid is $[\alpha]_D^{24} - 35.6°$ (c.=2.001 in ethanol).

On acidifying the combined mother liquors from the above mentioned three recrystallizations with 10 ml. of concentrated hydrochloric acid, diluting with water to double the volume and filtering with suction racemic acid can be recovered.

Example 45

16.0 g. (0.075 mol) of 1-bromo-adamantane, 80 ml. of 2-mercapto-ethanoic acid ethyl ester and 10 ml. of collidine are boiled for 15 hours in an atmosphere of nitrogen. After cooling the reaction mixture is diluted with 300 ml. of diethylether and is poured on 300 ml. of icewater. After addition of 100 ml. of concentrated aqueous sodium hydroxide solution the excess of 2-mercaptoethanoic acid ethyl ester is to be found in the aqueous phase. After filtration through Hyflo the aqueous solution is evaporated, the organic phase is washed twice with diluted sodium hydroxide solution and is dred with magnesium-sulfate. The ether is evaporated and the resulting dark oil (26 g.) is refluxed for 12 hours together with 25 g. of sodium hydroxide in 300 ml. of ethanol. After evaporation of the ethanol the residue is dissolved in 500 ml. of water, clarified with charcoal and Hyflo, acidified and extracted with benzene. After evaporation, dissolving the residue in sodium bicarbonate solution, clarification with charcoal and Hyflo, acidifying and extraction with ether and after drying and evaporation of the ether 8 g. of oil are obtained which can be recrystallized from hexane and acetone. The yield amounts to 4 g. (25%); melting point and mixed melting point 69–71°.

The IR-spectra of the acids produced according to both methods are identical (compare Example 33).

The following penicillin derivatives according to the invention are prepared from the corresponding starting materials in an analogous manner to the procedure of Example 43.

*Examples 46–51*

46. α - (Adamant - 1-ylthio)-4'-methyl-phenyl-methyl-penicillin.
47. α - (Adamant - 1-ylthio)-4'-chloro-phenyl-methyl-penicillin.
48. α - (Adamant - 1-ylthio)-4'-bromo-phenyl-methyl-penicillin.
49. α - (Adamant - 1 - ylthio) - 2' - methoxy-phenyl-methyl-penicillin.
50. α - (Adamant - 1-ylthio)-4'-trifluoromethyl-phenyl-methyl-penicillin.
51. α - (Adamant - 1 - ylthio)-3',5'-dimethyl-phenyl-methyl-penicillin.

In a third aspect, this invention relates to compounds of the formula

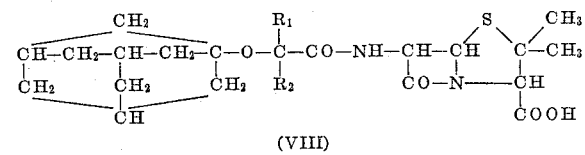

(VIII)

wherein $R_1$ represents hydrogen, alkyl, preferably with from 1 to 5 carbon atoms, cycloalkyl, preferably with 5 to 6 carbon atoms, or mononuclear carbocyclic aryl, particularly phenyl, lower alkyl-phenyl, chlorophenyl, bromophenyl, lower alkoxyphenyl, cyanophenyl or trifluoromethylphenyl;

$R_2$ represents hydrogen or a lower alkyl radical;

and wherein $R_1$ and $R_2$ together can be a polymethylene bridge of 2 to 7 carbon atoms, and the salts of these compounds obtained by neutralization of the free acid of Formula VIII with inorganic and organic bases. They possess an excellent antibacterial action against gram-positive bacteria, low hygroscopicity and high heat resistance. Their antibacterial action also extends to strains of the aforesaid bacteria which are resistant to Penicillin G.

"Lower" as used herein in connection with "alkyl" and the like radicals means "with 1 to 4 carbon atoms" unless stated otherwise.

The new compounds of Formula VIII are produced by a process according to the invention, which comprises:

(A) reacting (1) a reactive ester of a hydroxyl compound of the formula

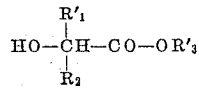

(IX)

wherein $R'_1$ represents hydrogen, an aliphatic, cycloaliphatic, aromatic or araliphatic radical, $R_2$ represents hydrogen or a lower alkyl radical, $R_1'$ and $R_2$ together can be a polymethylene bridge of 2 to 7 carbon atoms, and $R_3'$ represents a lower alkyl radical, for example the bromide, the chloride, the lower alkane-, especially methane sulfonic acid ester or the p-toluene sulfonic acid ester of a compound of Formula IX with heating preferably at 60° to 200° C. and advantageously with the exclusion of air, in a suitable inert organic solvent particularly diethylene glycol dimethyl ether; with (2) a reactive salt of 1-adamantanol, in particular the alkali metal salts thereof, which may be formed in situ, whereby the corresponding α-(adamant-1-oxy)-carboxylic acid alkyl ester is obtained;

(B) Saponifying the latter compound, for example by moderate heating in an alkanolic alkali liquor, and then, if desired, isolating the free acid by acidification, for example with aqueous alkanolic hydrochloric acid, thereby obtaining the corresponding free adamantyloxy alkanoic acid of the formula

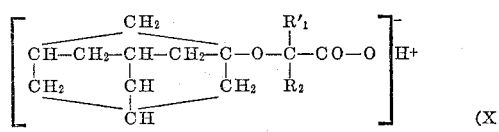

(X)

wherein $R_1'$ and $R_2$ have the meanings given hereinbefore; or, depending on the nature of the alkaline medium and the base used, the corresponding salt of said acid;

(C) reacting the free acid of Formula X if desired, with (α) thionyl chloride, phosphorus pentachloride, phosphorus oxychloride or oxybromide at a temperature between room temperature (20° C.) and reflux temperature of the resulting mixture, depending on the stability of the acid involved, and, when necessary, a hydrocarbon solvent such as benzene, in order to produce the corresponding acyl chloride or bromide, or (β) with acetic acid anhydride or thionyl chloride, with heating between 40° C. and reflux temperature of the mixture in order to produce either a mixed anhydride of the acid of Formula X acetic acid or the anhydride of the acid of Formula X (γ) with a chloroformic ester of the formula Cl—CO—OR'' wherein R'' is lower alkyl, especially ethyl or isobutyl, or benzyl, p-nitro benzyl, allyl or methallyl, at about 0° C., thereby obtaining so-called "mixed anhydrides" of the acids of the Formula X which are carbonic acid esters of the formula

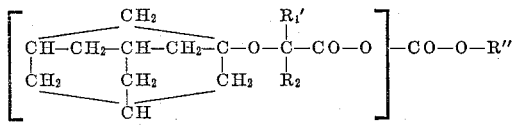

wherein $R_1'$, $R_2$ and R'' have the aforesaid meanings;

(D) reacting the free acid of Formula X obtained in step B, or one of the reaction products of step (C)(α), (β) or (γ) with 6-amino-penicillanic acid, namely, more in detail:

(1) halides, anhydrides and mixed anhydrides at room temperature, or, if necessary with cooling to about 0° C. in the presence of acid-binding agents, in particuar in the presence of sodium or potassium bicarbonate, -carbonate or -hydroxide in aqueous organic or inorganic medium, and tertiary organic bases such as triethylamine or pyridine in organic medium, for example in dioxan, tetrahydrofuran, acetone or chloroform;

(2) the free acids of Formula X above in the presence of water-binding agents, such as dicyclohexyl carbodiimide, diisopropyl carbodiimide and the like di-alkyl and di-cycloalkyl carbodiimides wherein alkyl and cycloalkyl have about 3 to 6 carbon atoms, at the temperatures mentioned above under (D)(1);

(E) isolating the reaction products from steps (D)(1) or (2) from the respective aqueous organic media, for example, by acidifying in the cold and extracting the 6-acylamino-penicillanic acid with a water-immiscible organic solvent such as methylisobultylketone, ethyl acetate, n-amyl-acetate, or the like;

(F) extracting the last-mentioned acid from said solvent, for example, with an aqueous sodium or potassium bicarbonate or carbonate solution, whereupon the resulting aqueous solution of the sodium or potassium salt of 6-acylamino-penicillanic acid can be evaporated in vacuo at low temperatures, or, preferably lyophilized.

When $R_1'$ and $R_2$ in the Formula VIII are different from each other, the products are obtained as racemates which can be separated if desired into their antipodes in a conventional manner. Preferably, the separation is realized by reacting the racemic acids of the Formula X with optically active organic bases, for example, with (+) or (−)-α-phenyl-ethyl-amine in suitable solvents such as aqueous ethanol. The precipitated optically active salt is recrystallized and, if desired, the optically active acid is liberated, and then further reacted as described above.

For producing penicillin salts with organic bases, the latter can be reacted, for example, with the free acids in organic solvents or the alkali salts of the penicillins can be brought together in water with salts of the organic bases, for example the hydrochlorides, and the precipitated salts can be separated and dried.

The isolation of salts of 6-acylamino-pencillanic acid from organic reaction media can be carried out either directly by extraction with aqueous sodium or potassium bicarbonate solutions or by precipitation with organic bases.

In compounds of Formulas IX and X, $R_1'$ is for example hydrogen, a methyl, ethyl, n-propyl, isopropyl, n-butyl, secondary butyl, isobutyl, tertiary butyl, n-amyl or isoamyl radical, an alkyl radical bridged by oxygen or sulfur, such as the β-ethoxyethyl or γ-methylthio-propyl radical, an alkenyl radical such as the allyl or methallyl radical, a cycloalkyl or cycloalkenyl radical such as the cyclopropyl, cyclobutyl, cyclopentyl, cyclohexyl, cycloheptyl-cyclohexyl-methyl, 2,5 - endomethylene-cyclohexyl, cyclooctyl, 2,5-endomethylene-cyclohexylmethyl, 1- or 2-cyclohexenyl or 2,5-endomethylene - 3 - cyclohexenyl radical, an aryl or substituted aryl radical such as the phenyl, p-tolyl, 3,4 - dimethylphenyl p-isopropyl-phenyl, m- or p-fluoro-phenyl, m- or p-chloro-phenyl, p-bromo-phenyl, m- or p-trifluoromethyl-phenyl, p-methoxy-phenyl, p-ethoxy-phenyl, p-isopropoxy-phenyl, 3,4 - dimethoxy-phenyl, 3,4,5 - trimethoxy-phenyl, 3,4 - methylenedioxy-phenyl, m-nitro-phenyl, p-nitro-phenyl, p-methylsulfonyl-phenyl or β-naphthyl radical, an aralkyl or substituted aralkyl radical such as the benzyl, o-, m- or p-methyl-benzyl, p-isopropyl-benzyl, p-fluoro-benzyl, p-chloro-benzyl, p-methoxy-benzyl, 3,4 - dimethoxy-benzyl, 3,4,5 - trimethoxy-benzyl, 3,4 - methylenedioxy-benzyl, α-phenyl-ethyl, β-phenyl-ethyl or γ-phenyl-propyl radical, or an aryloxyalkyl or arylthioalkyl radical, which may be substituted, such as the β-phenoxy-ethyl or β-phenylthio-ethyl radical. $R_2$ is for example hydrogen or one of the above mentioned lower alkyl radicals and $R_3'$ in Formula IX is, for example, one of the above mentioned alkyl radicals, in particular a methyl or ethyl radical.

Another method leading to the esters of the acid represented by Formula X consists in reacting compounds of the formula

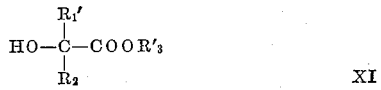

XI wherein $R_1$, $R_2$ and $R_3'$ have the significance indicated in the Formulae VIII and IX, with reactive esters of 1-adamantanol in the presence of acid binding agents. The reaction may, for example, be carried out at temperatures between 100 and 180° in an excess of the reaction partner of the Formula X or in an inert organic solvent.

The reactive 1-adamantanol esters should preferably be 1-bromo-adamantane, and also 1-chloro- or 1-iodo-adamantane, 1-adamantanol-p-toluene sulfonate, -methylsulfonate or -trifluoro-acetate.

An amount of a tertiary organic base, which is equivalent to the quantity of the reactive 1-adamantanol ester may serve as an acid-binding agent, preferably triethylamine, pyridine and collidine.

Salts of the free acid of Formula X obtained either directly from the alkaline phase (described in step (B)), or by neutralization of the free acid, or by exchange of cations of the said salts for those of another inorganic or organic base, are, for example, the sodium, potassium, lithium, ammonium, ethyl ammonium, triethyl ammonium, piperidinium, ethanol ammonium, diethanol ammonium, or N,N-diethylethanol ammonium salts or the corresponding magnesium, calcium or ethylenediammonium salts in which one equivalent weight of the latter cations is neutralized by two equivalent weights of the anion of the acid of Formula X.

These salts are starting intermediates for the next following steps, in that they can be isolated in a conventional manner and then used for preparing the free acid therefrom in a pure form, which can then be reintroduced into step (C) of the above-described process according to the invention.

Sodium, potassium, lithium, ammonium, magnesium or calcium salts, or salts of organic bases such as ethylamine, diethylamine, triethylamine, ethanolamine, diethanolamine, N-ethyl-diethanolamine, diethylaminoethanol, pyrrolidine, piperidine, N-ethyl-piperidine, 1-(β-hydroxyethyl)-piperidine, morpholine, procaine, benzylamine, dibenzylamine, 1 - phenyl-propyl - (2) - amine and other amines, which are often used for producing penicillin salts, are salts of acids of the Formula VIII which may be produced in accordance with the invention.

The compounds according to this aspect of the invention are stable against mineral acids. When exposed for several hours to the attack of aqueous hydrochloric acid of pH 2, at 20 to 25° C., more than 50% of the compounds is still undecomposed.

The following non-limitative examples further illustrate the preparation of the compounds according to this aspect of the invention more in detail. The temperatures are given therein in degrees centigrade. (g.=gram, mmol= millimole, ml.=milliliter, torr=mm. Hg.)

*Example 52*

(a) *Adamant-1-oxy-acetic acid.*—16 g., 57 millimoles, 1-bromo-adamantane are refluxed in 80 ml. of glycolic acid-butyl ester and 10 ml. of collidine for 15 hours. After evaporation of excess glycol acid ester at 86°/16 torr the reaction product is dissolved in 500 ml. ether, extracted three times with the 500 ml. portions of water, one with 500 ml. of 0.5 HCl and finally again with 500 ml. of water. After drying over MgSO₄ and evaporation, the resulting residue is refluxed with 500 ml. ethanol, 25 g. NaOH and 50 ml. of water for 12 hours. After evaporation of the alcohol, 500 ml. of water, charcoal and Hyflo are added, the mixture is heated to boiling, filtered, and finally acidified at 0° with concentrated HCl. Filtration and washing the resulting precipitate with water gives 13 g. of the title acid, M.P. 120–130°, and after recrystallization from cyclohexane 11 g., 72%, white crystals melting at 129–132°.

*Analysis.*—$C_{12}H_{19}O_2N$. Calculated: C, 68.86; H, 9.15; N, 6.69. Found: C, 68.80; H, 9.23; N, 6.81.

(b) 0.97 g. of (adamant-1-oxy)-acetic acid and 0.7 ml. of triethylamine are dissolved in 12 ml. of dioxan and 10 ml. of acetone and cooled to a temperature between 0° and 5°. 0.63 ml. of isobutyl chloroformate, dissolved in 5 ml. of dioxan, are added thereto drop by drop, the whole is stirred for 15 minutes at 0° and then separated from residual triethylaminehydrochloride by filtration. A solution of 1.16 g. of 6-aminopenicillanic acid (86.1%—pure) in 10 ml. of water and 1 ml. of triethylamine is added to the filtrate which is cooled to 0°. The reaction solution is stirred for 60 minutes at room temperature. 10 ml. of water containing 1 g. sodium bicarbonate dissolved therein are then added and the whole is washed twice using 25 ml. of ether each time. The aqueous phase is covered with a layer of 20 ml. of methylisobutyl ketone and adjusted to pH 2.1 with 10 N sulfuric acid. Stirring causes the largest part of the reaction product to pass over into the organic phase as free acid. The layers are separated and the aqueous phase is extracted once more using 5 ml. of methylisobutyl ketone. The methylisobutyl ketone extracts are combined, washed with 5 ml. of water and dried with sodium sulfate. The methyl isobutyl ketone solution is now shaken with a 3%-sodium bicarbonate solution until the aqueous phase has attained a pH of 6.8–7.0. The phases are separated and the organic phase is again extracted with 5 ml. of water. The combined aqueous phases are washed with 25 ml. of ether and liberated from dissolved ether in a rotary evaporator under reduced pressure. The clear and almost colorless solution of the resulting sodium salt of (adamant-1-oxy)-methyl-penicillin is lyophilized.

There is obtained a white, voluminous powder, the antibiotic activity of which is determined in near accordance with the agar-incorporation test described by Florcy et al. in "Antibiotics," published by Oxford University Press 1949, especially pages 201–203. In this test, a culture of microorganisms grown at 37° C. for 24 hours is transferred with the aid of a velvet-covered sterile stamper to a series of sterile agar plates containing the antibiotic to be tested in varying concentrations. The inoculated plates (sub-cultures) are then incubated at 37° C. for 24 hours. That concentration of the antibiotic at which growth of the respective bacterium is completely inhibited is called the "minimum inhibitory concentration."

The aforesaid final product inhibits the growth of *Staphylococcus aureus* NCTC 7447 in the above described agar incorporation test at a concentration of less than 0.01 microgram per milliliter ($\mu$g./ml.).

*Example 53*

(a) The same compound may be obtained by the following alternate method:

To 15.2 g., 0.1 mol, 1-hydroxy-adamantane in 250 ml. diglyme, 18 ml., 0.15 mol, sodium amide suspension in toluene are added at 140°. After heating for 16 hours at 150–160°, 33.5 g., 0.2 mol, bromo acetic acid ethyl ester are added slowly and the resulting mixture is heated to reflux for 16 hours. The mixture is then cooled, poured into 1 liter of water, extracted with benzene and worked up as above to give adamant-1-yl-oxy-acetic acid, M.P. 129–131°. (Yield=25%).

(b) 1.14 g. of $\alpha$ - (adamant-1-yl-oxy)-propionic acid (=10% excess calculated on 6-amino penicillanic acid) is dissolved in 5 ml. of thionyl chloride and boiled under reflux for 30 minutes. The excess thionyl chloride is evaporated in vacuo, the residue is dissolved in benzene and the latter solvent evaporated, leaving a residue which is dried in high vacuum (0.01 torr) for one hour and the resulting crude acid chloride is subsequently used without purification for the following reaction.

(c) 1.16 g. of 6-amino penicillanic acid (86.1% pure) is dissolved in 25 ml. of water containing 3 g. of sodium bicarbonate, the solution is cooled to 0 to 5° in an ice bath, and the acid chloride produced under (b) supra, dissolved in 20 ml. acetone, is added thereto drop by drop with vigorous stirring. After the addition, which takes about 10 minutes, the ice bath is removed and the reaction mixture is stirred for 60 minutes at room temperature. The solution is now extracted with two times 10 ml. of ether and then covered with a layer of 20 ml. of methyl isobutyl ketone. The pH of the aqueous phase is adjusted to 2.1 by adding aqueous 10 N-sulfuric acid. The free acid of $\alpha$-(adamant-1-oxy)-ethyl penicillin passes over into the organic phase. The layers are separated and the aqueous phase is extracted once with 5 ml. of methyl isobutyl ketone. The methyl isobutyl ketone solutions are combined and washed with 5 ml. of water. The sodium and the potassium salts of the $\alpha$-(adamant-1-oxy)-ethyl-penicillin [sodium, or potassium, 6-(2'-[adamant-1"-oxy]propionamido)-penicillanate] are obtained from the free acid in an analogous manner as described in Example 52, by extraction with aqueous sodium bicarbonate, or potassium bicarbonate solution, respectively.

*Example 54*

(a) In exactly the same manner as described in Example 53, the acid chloride is produced from 1.29 g. of $\alpha$-(adamant-1-oxy)-isovaleric acid (=10% excess calculated on 6-amino-penicillanic acid).

(b) 1.16 g. of 6-aminopenicillanic acid 86.1% is suspended in 30 ml. of anhydrous chloroform and 2 ml. of triethyl amine and stirred for 30 minutes at room temperature. The solution is filtered and cooled to 0°. The aforesaid acid chloride, which is dissolved in 10 ml. chloroform, is added thereto drop by drop during 5 minutes and the reaction mixture is stirred for one hour at room temperature. The solvent is removed from the clear, pale yellow solution in a rotary evaporator (water bath temperature 25°) and the residue is taken up in 30 ml. of water and 50 ml. of methyl isobutyl ketone. The pH of the aqueous portion is adjusted to 2.1 with 10 N sulfuric acid and the phases are separated. The aqueous layer is extracted with 5 ml. of methyl isobutyl ketone. As is described in Example 53 the sodium salt of $\alpha$-(adamant-1-oxy)-isobutyl-penicillin is extracted by shaking with an aqueous 3%-sodium bicarbonate solution. The product, an almost white amorphous powder, has a purity of about 85 to 90% according to quantitative analysis data and iodometric titration. In the agar incorporation test it shows the following minimum inhibitory concentrations against Staphylococcus (R=highly resistant, r=weakly resistant, s=sensitive to penicillin G):

| Staphylococcus strain: | Concentration in $\mu$g./ml. |
|---|---|
| *aureus* Geigy 5001 R | 1–10 |
| *aureus* Geigy 5002 r | 1 |
| *aureus* Geigy 5003 R | 10 |
| *aureus* Geigy 5005 r | 1 |
| *lactis* NCTC 8340 s | 0.1 |
| *aureus* Smith s | 0.1–1 |

In the infra-red spectrum (potassium bromide) the substance shows a strong band at 5.65$\mu$ indicating the presence of a $\beta$-lactam ring.

On replacing 1.4 g. of $\alpha$-(adamant-1-oxy)-isovaleric acid, which represents a racemate, by a corresponding amount of one of the two antipodes, the optically pure $\alpha$-(adamant-1-oxy)-isobutyl penicillins are obtained.

The $\alpha$-(adamant-1-oxy)isovaleric acid used for making the chloride used as starting material is prepared by the method described in Example 55 hereinafter.

*Example 55.—[Adamant-1-oxy]-$\beta$-methyl-butyric acid*

16 g., 75 mmol. 1-bromo-adamantane, 40 ml. d,l-$\alpha$-hydroxy-isovaleric acid ethyl ester and 10 ml. of collidine are heated to reflux for 16 hours. Evaporation of the excess hydroxy ester and work up as in Example 52 affords 10 g., of title acid from hexane and cyclo-hexane, M.P. 96 to 98°. (Yield 53%.)

*Analysis.*—$C_{15}H_{24}O_3$. Calc.: C, 71.39; H, 9.59. Found: C, 71.41; H, 9.66.

*Example 56.—Racemic-(adamant-1-oxy)-propionic acid*

This acid is obtained by one of the following methods:

(a) Using the procedure described in Example 54 with racemic lactic ester instead of the optically active one. Yield: 70%, M.P. 109 to 112°.

(b) Using the procedure described in Example 55 with 7 g. of sodium instead of collidine. Yield: 45%, M.P. 109 to 112°.

(c) Using the procedure described in Example 53 using 1-hydroxy-adamantane and α-bromo-propionic acid ethyl ester. Yield: 3%, M.P. 110 to 112°.

*Example 57.—1-[adamant-1-oxy]-cyclopentane-1-carboxyclic acid*

10 g., 46.5 mmol. 1-bromo-adamantane, 21 g., 0.15 mol, 1-hydroxy-cyclopentane - 1 - carboxylic acid methyl ester and 6.3 ml., 48 mmol. collidine are heated to 150–160° for 20 hours. Work up as in Example 52 gives 1.5 g., of pure title acid from alcohol and water. M.P. 155 to 158°. (Yield 12%.)

By repeating this example, but using an equimolar amount of 1-hydroxy-cyclohexane-1-carboxylic acid as second starting material, there is obtained 1-[adamant-1-oxy]-cyclohexane-1-carboxylic acid.

*Example 58*

The N-ethyl-piperidinium-salt of α-(adamant-1-oxy)-isobutyl penicillin is obtained, for example, in the following manner:

300 mg. of the sodium salt of α-(adamant-1-ylthio)-isobutyl penicillin is dissolved in 10 ml. of water and covered with a layer of 40 ml. of ether. The whole is cooled in an ice bath and the aqueous solution is acidified with stirring (pH 2.1). The layers are separated and the aqueous layer is extracted with 5 ml. of ether. The combined ether extracts are washed twice using 3 ml. of water each time and dried with sodium sulfate. The solution is cooled to −15° to −20° and a solution of 70 mg. of N-ethyl-piperidine in 3 ml. of ether is added slowly. The N-ethyl-piperidinium salt, precipitating in fine droplets, is liberated by means of centrifuging from the mother liquor and is dissolved in 5 ml. of dioxan. The dioxan is removed in high vacuum at a low temperature, a white hygroscopic powder remaining. In in vitro tests, it shows the same activity as the corresponding sodium salt (see Example 54).

*Example 59*

The 1 - phenyl - propyl - (2) - ammonium salt of α-(adamant - 1 - oxy) - isobutyl - pencillin is easily obtained in pure form in the following manner:

300 mg. of the sodium salt of α - (adamant - 1 - oxy) isobutyl penicillin are dissolved in 3 ml. of water and cooled in an ice bath. A solution of 105 mg. of 1 - phenyl-propyl - (2) - amine hydrochloride in 3 ml. of water is added drop by drop. The flaky, white precipitate, which forms immediately, is recovered by means of centrifuging or by rapid filtration under suction. It is dissolved in absolute benzene and the solutionis lyophilized. The white powder, which forms in an almost quantitative yield, is sparingly soluble in water, but easily soluble in organic solvents. It has the same effect (in in vitro tests) against Staphylococci as the corresponding sodium salt (see Example 54).

*Example 60.—Optically active α-[adamant-1-oxy]-propionic acid*

56 g., 0.26 mol 1 - bromoadamantane, 208 ml. 1 - lactic acid ethyl ester $[\alpha]_D^{26°} = -9.97°$ (C=100) and 35 ml. collidine are refluxed for 15 hours.

After evaporation of the excess lactic acid ester, the residue is taken up in 1 liter of benzene, extracted three times with 1 liter of water, once with 1 liter of 0.5 N aqueous hydrochloric acid and again with 1 liter of water. The organic phase is dried over $MgSO_4$ and concentrated giving 70 g. of a residue which is refluxed with 700 ml. ethanol, 35 g. NaOH, and 70 ml. water for 12 hours. The alcohol is distilled off, the residue dissolved in 1 liter of water, cleared with Hyflo and charcoal, acidified, filtered and washed with water to give 49 g., 85% of crude title acid. After dissolving in benzene, drying over $MgSO_4$ and recrystallization from cyclohexane and hexane, the yield is 41 g., 71%, melting point 95 to 100°. $[\alpha]_D^{23}$ −46.3° (C. 1.58, EtOH).

*Analysis.*—$C_{13}H_{20}O_3$. Calc. C, 69.61; H, 8.99. Found: C, 69.80; H, 9.07.

The following pencillin derivatives according to the invention are prepared from the corresponding starting materials in an analogous manner to the procedure of Example 52:

*Examples 61–72*

61. α-(Adamant-1-oxy)-4′-methyl-benzyl-penicillin.
62. α-(Adamant-1-oxy)-4′-chloro-benzyl-penicillin.
63. α-(Adamant-1-oxy)-4′-bromo-benzyl-penicillin.
64. α-(Adamant-1-oxy)-2′-methoxy-benzyl-penicillin.
65. α-(Adamant-1-oxy)-4′-trifluoromethyl-benzyl-penicillin.
66. α-(Adamant-1-oxy)-3′,5′-dimethyl-benzyl-penicillin.
67. α(Adamant-1-oxy)-n-propyl-penicillin.
68. α-(Adamant-1-oxy)-isopropyl-penicillin.
69. α-(Adamant-1-oxy)-n-amyl-penicillin.
70. α-(Adamant-1-oxy)-cyclopentyl-methyl-penicillin.
71. α-(Adamant-1-oxy)-benzyl penicillin.
72. α-(Adamant-1-oxy)-n-butyl-penicillin.

We claim:

1. A compound of the formula $$A-CO-NH-CH-CH \begin{matrix} S \\ \\ CO-N \end{matrix} \begin{matrix} CH_3 \\ C-CH_3 \\ CH \\ COOR \end{matrix}$$

wherein
A is a member selected from the group consisting of the radicals of the formulas each of $R_1$, $R_2$ and $R_3$ represents alkylene, lower alkyl-alkylene, hydroxy - alkylene, oxo - alkylene, lower alkoxy-alkylene, chloro - alkylene, bromo - alkylene, chloro-lower alkyl - alkylene, bromo - lower alkyl - alkylene, exo - methylene - alkylene or alkenylene, the number of carbon atoms of "alkylene" and "alkenylene" in the said definitions of $R_1$, $R_2$ and $R_3$ being from 2 to 4, said carbon atoms being ring members between the two C-bridges, $R_4$ represents hydrogen, lower alkyl, halogen, or phenyl,
$R_5$ represents alkylene of from 2 to 3 carbon atoms,
$Y_1$ represents hydrogen, lower alkyl, hydroxyl or lower alkoxy,
$Y_2$ represents hydrogen or lower alkyl,
$Y_1$ and $Y_2$ when taken together represent oxo,
$R_2''$ represents alkylene, lower alkyl - alkylene, hydroxy-alkylene, oxo - alkylene or lower alkoxy - alkylene, the number of carbon atoms of "alkylene" in the said definitions of $R_2''$ being from 3 to 4, said carbon atoms being ring members between the two C-bridges, R represents hydrogen or a cation, the salt of which falling under the above formula is pharmaceutically acceptable, and $R_2°$ represents alkylene, hydroxy - alkylene, oxo-alkylene or oxo - alkenylene, the number of carbon atoms of each of the said "alkylene" and "alkenylene" of $R_2°$ being from 3 to 4, said carbon atoms being ring members between the two C-bridges.

2. A compound of the formula

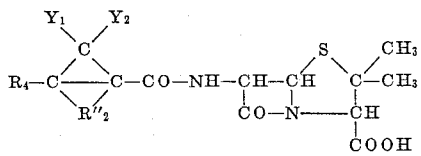

wherein $R_2''$ represents alkylene, lower alkyl-alkylene, hydroxy-alkylene, oxo-alkylene or lower alkoxy-alkylene, the number of carbon atoms of "alkylene" in the said definitions of $R_2''$ being from 3 to 4, said carbon atoms being ring members between the two C-bridges, $R_4$ represents hydrogen, lower alkyl, halogen, or phenyl, $Y_1$ represents hydrogen, lower alkyl, hydroxyl or lower alkoxy, $Y_2$ represents hydrogen or lower alkyl, $Y_1$ and $Y_2$ when taken together represent oxo, and R represents hydrogen or a cation, the salt of which falling under the above formula is pharmaceutically acceptable.

3. A compound of the formula

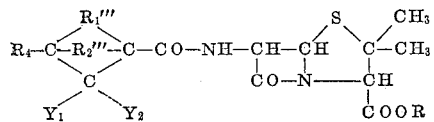

wherein each of $R_1'''$ and $R_2'''$ represents ethilene, lower alkyl ethylene, hydroxy-ethylene, oxo-ethylene, lower alkoxy - ethylene, chloro - ethylene, bromo - ethylene, chloro-lower alkyl-ethylene, bromo-lower alkyl-ethylene or exo-methyleno-ethylene, $R_4$ represents hydrogen, lower alkyl, or halogen, $Y_1$ represents hydrogen, lower alkyl, hydroxyl or lower alkoxy, $Y_2$ represents hydrogen or lower alkyl, $Y_1$ and $Y_2$ when taken together represent oxo, and R represents hydrogen or a cation, the salt of which falling under the above formula is pharmaceutically acceptable.

4. A compound of the formula

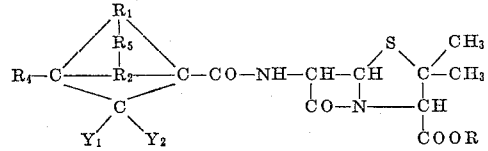

wherein each of $R_1$ and $R_2$ represents alkylene, lower alkyl-alkylene, hydroxy-alkylene, oxo-alkylene or lower alkoxy-alkylene, the number of carbon atoms of the "alkylene" moiety in the said groups represented by $R_1$ and $R_2$ being from 2 to 4, said carbon atoms being ring members between the two C-bridges;

$R_4$ represents hydrogen, lower alkyl, halogen or phenyl, $R_5$ represents alkylene of from 1 to 2 carbon atoms, $Y_1$ represents hydrogen, lower alkyl, hydroxyl or lower alkoxy, $Y_2$ represents hydrogen or lower alkyl, $Y_1$ and $Y_2$ when taken together represent oxo, and R represents hydrogen or a cation, the salt of which falling under the above formula is pharmaceutically acceptable.

5. A compound of the formula

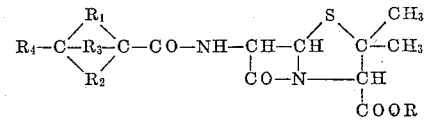

wherein each of $R_1$ and $R_2$ represents alkylene, or oxo-alkylene and $R_3$ represents alkylene or alkenylene, the number of carbon atoms of the said "alkylene" and "alkenylene" moieties being from 2 to 4, said carbon atoms being ring members between the two C-bridges, $R_4$ represents hydrogen, lower alkyl and halogen, and R represents hydrogen or a cation, the salt of which falling under the above formula is pharmaceutically acceptable.

6. A compound of the formula

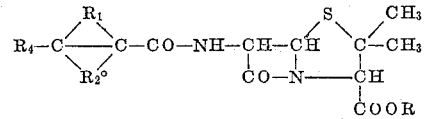

wherein $R_1$ represents straight-chain alkylene of from 3 to 4 carbon atoms, said carbon atoms being ring members between the two C-bridges, $R_2°$ represents alkylene, hydroxy-alkylene, oxo-alkylene or oxo-alkenylene, the number of carbon atoms of each of the said "alkylene" or "alkenylene" of $R_2°$ being from 3 to 4, said carbon atoms being ring members between the two C-bridges, $R_4$ represents hydrogen, lower alkyl or halogen, and R represents hydrogen or a cation, the salt of which falling under the above formula is pharmaceutically acceptable.

7. A pharmaceutically acceptable salt of 7,7-dimethyl-tricyclo[2,2,1,0$^{2,6}$]heptyl-(1)-penicillin.

8. A pharmaceutically acceptable salt of adamantyl-(1)-penicillin.

9. A pharmaceutically acceptable salt of tricyclo [4,3,1,1$^{3,8}$]undecyl-(3)-penicillin.

10. A pharmaceutically acceptable salt of 10-nor-camphor-1-yl-penicillin.

11. A pharmaceutically acceptable salt of bicyclo [2,2,2]octyl-(1)-penicillin.

12. A pharmaceutically acceptable salt of isocamphan-1-yl penicillin.

13. A pharmaceutically acceptable salt of camphen-4-yl-penicillin.

14. A pharmaceutically acceptable salt of trans-2-hydroxy-decahydronaphthyl-(4a)-penicillin.

15. A member selected from the group consisting of a compound of the formula

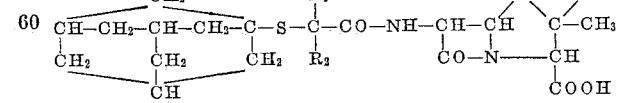

wherein $R_1$ is a member selected from the group consisting of hydrogen, alkyl with from 1 to 5 carbon atoms, cycloalkyl with from 5 to 6 carbon atoms, phenyl, lower alkylphenyl, chlorophenyl, bromophenyl, lower alkoxyphenyl, cyanophenyl, and trifluoromethylphenyl, and $R_2$ is a member selected from the group consisting of hydrogen and lower alkyl, and a non-toxic salt thereof.

16. (Adamant-1-ylthio)-methyl-penicillin.

17. A non-toxic salt of (adamant-1-ylthio)-methyl-penicillin.
18. α-(Adamant-1-ylthio)-ethyl-pencillin.
19. A non-toxic salt of α-(adamant-1-ylthio)-ethyl-penicillin.
20. α-(Adamant-1-ylthio)-isobutyl-penicillin.
21. A non-toxic salt of α-(adamant-1-ylthio)-isobutyl-penicillin.
22. α-(Adamant-1-ylthio)-n-amyl-pencillin.
23. α-(Adamant-1-ylthio)-isopropyl-penicillin.
24. α-(Adamant-1-ylthio) - α - cyclopentyl - methyl-penicillin.
25. A member selected from the group consisting of a compound of the formula

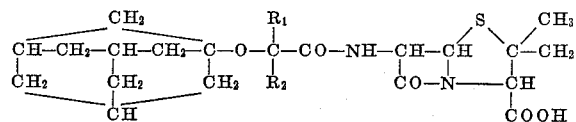

wherein
$R_1$ is a member selected from the group consisting of hydrogen, alkyl with from 1 to 5 carbon atoms, cycloalkyl with from 5 to 6 carbon atoms, phenyl, lower alkylphenyl, chlorophenyl, bromophenyl, lower alkoxyphenyl, cyanophenyl, and trifluoromethylphenyl,
$R_2$ is a member selected from the group consisting of hydrogen and lower alkyl, and
$R_1$ and $R_2$ taken together can be a polymethylene bridge of from 4 to 5 carbon atoms
and a non-toxic salt thereof.

26. (Adamant-1-oxy)-methyl-penicillin.
27. A non-toxic salt of (adamant-1-oxy)-methyl-penicillin.
28. α-(Adamant-1-oxy)-ethyl-penicillin.
29. A non-toxic salt of α-(adamant-1-oxy)-ethyl-penicillin.
30. α-(Adamant-1-oxy)-isobutyl-penicillin.
31. A non-toxic salt of α-(adamant-1-oxy)-isobutyl-penicillin.
32. α-(Adamant-1-oxy)-n-amyl-penicillin.
33. α-(Adamant-1-oxy)-isopropyl-penicillin.
34. α-(Adamant - 1 - oxy)-α-cyclopentyl-methyl-penicillin.
35. α-(Adamant-1-oxy)-n-butyl-penicillin.
36. The sodium salt of adamantyl-(1)-penicillin.
37. The sodium salt of tricyclo[4,3,1,1$^{3,8}$]undecyl-(3)-penicillin.
38. The N-ethyl piperidinium salt of 10-nor-camphor-1-yl-penicillin.
39. The sodium salt of bicyclo[2,2,2]octyl-(1)-penicillin.
40. The sodium salt of isocamphan-1-yl-penicillin.
41. The sodium salt of camphen-4-yl-penicillin.
42. The sodium salt of trans-2-hydroxy-decahydro-naphthyl-(4a)-penicillin.

No references cited.

NICHOLAS S. RIZZO, *Primary Examiner.*